US012794168B2

(12) United States Patent
Chen et al.

(10) Patent No.: US 12,794,168 B2
(45) Date of Patent: Nov. 10, 2026

(54) ELECTRICAL CONNECTOR WITH RELIABLE CONDUCTIVE TERMINAL STRUCTURE AND APPLICATION THEREOF IN LIQUID-COOLED ENVIRONMENT

(71) Applicant: DONGGUAN LUXSHARE TECHNOLOGIES CO., LTD, Dongguan City (CN)

(72) Inventors: Maoshan Chen, Dongguan City (CN); Hongji Chen, Dongguan City (CN); Chuanqi Gong, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 288 days.

(21) Appl. No.: 18/645,050

(22) Filed: Apr. 24, 2024

(65) Prior Publication Data

US 2024/0429641 A1 Dec. 26, 2024

(30) Foreign Application Priority Data

Jun. 26, 2023 (CN) ......................... 202310766873.2

(51) Int. Cl.
*H01R 13/46* (2006.01)
*H01R 13/11* (2006.01)
*H01R 12/70* (2011.01)

(52) U.S. Cl.
CPC ........... *H01R 13/46* (2013.01); *H01R 13/112* (2013.01); *H01R 12/707* (2013.01)

(58) Field of Classification Search
CPC .............................. H01R 13/46; H01R 13/112
See application file for complete search history.

(56) References Cited

U.S. PATENT DOCUMENTS

| | | | |
|---|---|---|---|
| 6,575,776 | B1 | 6/2003 | Conner et al. |
| 11,196,219 | B2 | 12/2021 | Yang et al. |
| 2016/0093996 | A1 | 3/2016 | Phillips |

(Continued)

FOREIGN PATENT DOCUMENTS

| | | | |
|---|---|---|---|
| CN | 102804512 | A | 11/2012 |
| CN | 110034448 | A | 7/2019 |

(Continued)

OTHER PUBLICATIONS

U.S. Office Action for U.S. Appl. No. 18/644,425, dated May 29, 2026.

(Continued)

*Primary Examiner* — Phuong K Dinh
(74) *Attorney, Agent, or Firm* — Birch, Stewart, Kolasch & Birch, LLP

(57) ABSTRACT

An electric connector includes an insulating body, a number of conductive terminals and a metal shell. The insulating body includes a mating surface, a mating slot, a first guiding inclined surface, a first inner wall surface, a first bottom surface and a cooling liquid circulation groove. The conductive terminal includes an elastic contact arm. The elastic contact arm includes a contact portion and an end portion further bent from the contact portion. The end portion is provided with an end surface located outside the first inner wall surface. Besides, an application of the electrical connector in a liquid-cooled environment is disclosed.

20 Claims, 21 Drawing Sheets

(56) References Cited

U.S. PATENT DOCUMENTS

| | | | | |
|---|---|---|---|---|
| 2020/0383236 | A1 | 12/2020 | Edmunds et al. | |
| 2021/0021087 | A1 | 1/2021 | Tu et al. | |
| 2021/0400843 | A1 | 12/2021 | Yang | |
| 2022/0077632 | A1 | 3/2022 | Chen et al. | |
| 2022/0352675 | A1 | 11/2022 | Zerebilov et al. | |
| 2022/0416457 | A1 * | 12/2022 | Huang | H01R 12/7088 |
| 2023/0006380 | A1 * | 1/2023 | Fu | H01R 12/716 |

FOREIGN PATENT DOCUMENTS

| | | | |
|---|---|---|---|
| CN | 110876252 | A | 3/2020 |
| CN | 111065878 | A | 4/2020 |
| CN | 112636049 | A | 4/2021 |
| CN | 214754494 | U | 11/2021 |
| CN | 115224522 | A | 10/2022 |
| CN | 218161095 | U | 12/2022 |
| CN | 115633483 | A | 1/2023 |
| TW | M600946 | U | 9/2020 |

OTHER PUBLICATIONS

U.S. Office Action for U.S. Appl. No. 18/645,107, dated Aug. 10, 2026.

* cited by examiner

ELECTRICAL CONNECTOR WITH RELIABLE CONDUCTIVE TERMINAL STRUCTURE AND APPLICATION THEREOF IN LIQUID-COOLED ENVIRONMENT

CROSS-REFERENCE TO RELATED APPLICATION

This patent application claims priority of a Chinese Patent Application No. 202310766873.2, filed on Jun. 26, 2023 and titled “ELECTRICAL CONNECTOR AND APPLICATION THEREOF IN LIQUID-COOLED ENVIRONMENT”, the entire content of which is incorporated herein by reference.

TECHNICAL FIELD

The present disclosure relates to an electrical connector, in particular to an electrical connector applied in a liquid-cooled environment.

BACKGROUND

Most electrical connectors are used in the air where no special heat dissipation structure is required. However, with the continuous enrichment of the application scenarios of the electrical connectors, it is also an active attempt to apply the electrical connectors in liquid-cooled environments.

The electrical connector generally includes an insulating body, a plurality of conductive terminals and a metal shell. The metal shell is generally formed by stamping, bending and buckling a metal sheet. The insulating body includes a mating surface and a mating slot extending through the mating surface. The conductive terminal includes an elastic arm extending into the mating slot. The elastic arm includes a contact portion and an end portion located at a free end of the contact portion. The end portion is usually designed to be longer to completely avoid improper abutment of a mating connector. However, in a liquid-cooled environment, in order to improve the integrity of signal transmission, the elastic arm needs to be shortened. Therefore, how to prevent the shortened elastic arm from being improperly abutted by the mating connector is a technical problem to be solved by those skilled in the art.

SUMMARY

An object of the present disclosure is to provide an electrical connector with a highly reliable conductive terminal structure and an application of the electrical connector in a liquid-cooled environment.

In order to achieve the above object, the present disclosure adopts the following technical solution: an electrical connector, including: an insulating body including a plurality of wall portions, a mating surface and a mating slot extending through the mating surface; the plurality of wall portions including a first wall portion; the first wall portion including a first guiding inclined surface adjacent to the mating surface, a first inner wall surface connected to the first guiding inclined surface and extending along a first direction, a first bottom surface connected to the first inner wall surface, and a cooling liquid circulation groove communicating with the mating slot; the mating slot being configured to at least partially receive a mating connector along the first direction; a plurality of conductive terminals, each conductive terminal including an elastic contact arm; the elastic contact arm including a contact portion which protrudes into the mating slot and is configured to be electrically connected with the mating connector, and an end portion which is connected to the contact portion and further bent from the contact portion; the end portion is spaced apart from the first bottom surface in the first direction; the electrical connector defining a first spacing groove between the first bottom surface and the end portion along the first direction; the end portion including an end surface; the end portion protruding beyond the first inner wall surface along a third direction such that the end surface is located outside the first inner wall surface; the third direction being perpendicular to the first direction; and a metal shell including a plurality of outer walls covering the insulating body; the plurality of outer walls including a first outer wall; the first outer wall defining a cooling liquid circulation slot communicating with the cooling liquid circulation groove.

In order to achieve the above object, the present disclosure adopts the following technical solution: an application of an electrical connector in a liquid-cooled environment, the electrical connector including: an insulating body including a plurality of wall portions, a mating surface and a mating slot extending through the mating surface; the plurality of wall portions including a first wall portion; the first wall portion including a first guiding inclined surface adjacent to the mating surface, a first inner wall surface connected to the first guiding inclined surface and extending along a first direction, a first bottom surface connected to the first inner wall surface, and a cooling liquid circulation groove communicating with the mating slot; the mating slot being configured to at least partially receive a mating connector along the first direction; a plurality of conductive terminals, each conductive terminal including an elastic contact arm; the elastic contact arm including a contact portion which protrudes into the mating slot and is configured to be electrically connected with the mating connector, and an end portion which is connected to the contact portion and further bent from the contact portion; the end portion is spaced apart from the first bottom surface in the first direction; the electrical connector defining a first spacing groove between the first bottom surface and the end portion along the first direction; the end portion including an end surface; the end portion protruding beyond the first inner wall surface along a third direction such that the end surface is located outside the first inner wall surface; the third direction being perpendicular to the first direction; and a metal shell including a plurality of outer walls covering the insulating body; the plurality of outer walls including a first outer wall; the first outer wall defining a cooling liquid circulation slot communicating with the cooling liquid circulation groove; wherein the electrical connector is immersed in the liquid of the liquid-cooled environment; the liquid is capable of flowing through the cooling liquid circulation slot and the cooling liquid circulation groove to take away the heat generated by the electrical connector.

Compared with the prior art, the elastic contact arm of the present disclosure includes the end portion connected to the contact portion and further bent from the contact portion. The end portion is spaced apart from the first bottom surface in the first direction. The electrical connector defines a first spacing groove between the first bottom surface and the end portion along the first direction. The end portion includes an end surface. The end portion extends beyond the first inner wall surface along the third direction such that the end surface is located outside the first inner wall surface. With such an arrangement, on the one hand, the length of the end portion is kept within a small dimension range, so as to improve the integrity of signal transmission; on the other hand, it ensures that the end portion will not be damaged by the mating connector, thereby improving the structural reliability of the conductive terminals.

DETAILED DESCRIPTION

Figure 1:
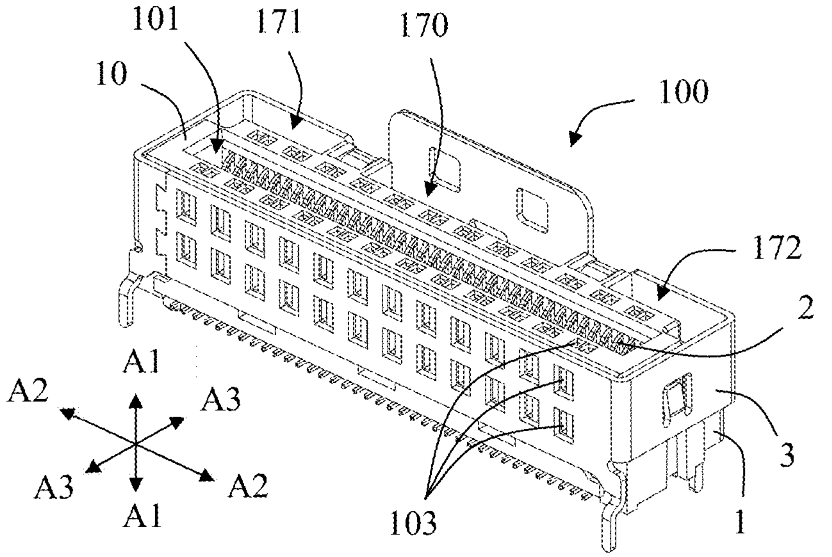
FIG. 1 is a schematic perspective view of an electrical connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 29, an illustrated embodiment of the present disclosure discloses an electrical connector 100 which includes an insulating body 1, a plurality of conductive terminals 2 fixed directly or indirectly to the insulating body 1, and a metal shell 3 covering the insulating body 1. The electrical connector 100 is configured to be applied in a liquid-cooled environment for mating with a mating connector (not shown) along a first direction A1-A1 (for example, a top-bottom direction).

Referring to FIG. 1 to FIG. 9, the insulating body 1 includes a plurality of wall portions, a mating surface 10, a mounting surface 16, a mating slot 101 extending upwardly through the mating surface 10 along the first direction A1-A1, and an installation slot 102 extending downwardly through the mounting surface 16 along the first direction A1-A1. The mating slot 101 is configured to at least partially receive the mating connector along the first direction A1-A1.

In the illustrated embodiment of the present disclosure, at least one of the plurality of wall portions defines a plurality of cooling liquid circulation grooves 103 communicating with the mating slot 101. Specifically, the plurality of wall portions include a first wall portion 11, a second wall portion 12 opposite to the first wall portion 11, a third wall portion 13 connecting one end of the first wall portion 11 and one end of the second wall portion 12, and a fourth wall portion 14 connecting another end of the first wall portion 11 and another end of the second wall portion 12. The first wall portion 11 is opposite to the second wall portion 12 and parallel to each other. The fourth wall portion 14 is opposite to the third wall portion 13 and parallel to each other. The mating slot 101 is at least enclosed by the first wall portion 11, the second wall portion 12, the third wall portion 13 and the fourth wall portion 14.

Figure 25:
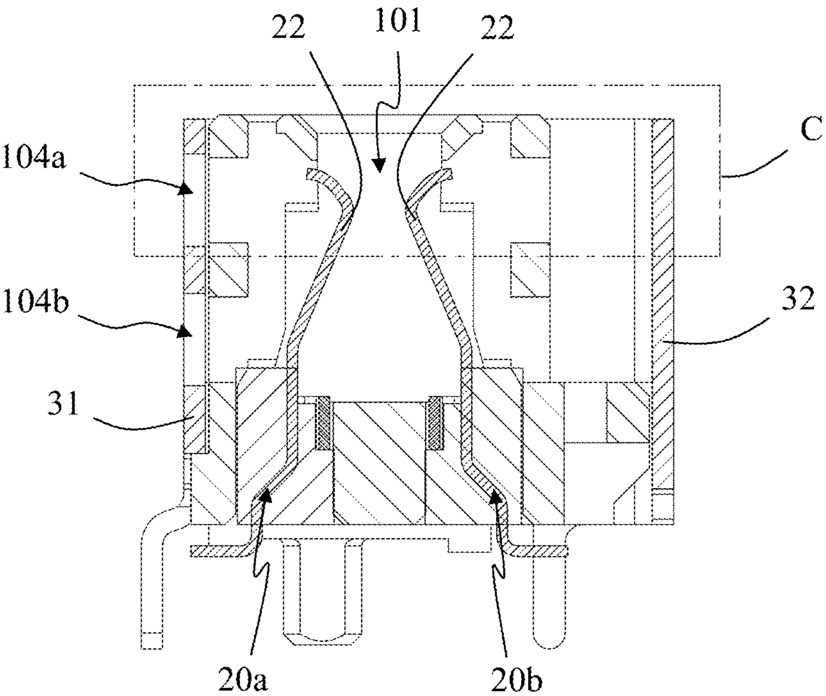
FIG. 25 is a schematic cross-sectional view taken along line B-B in FIG. 14.
Figure 26:
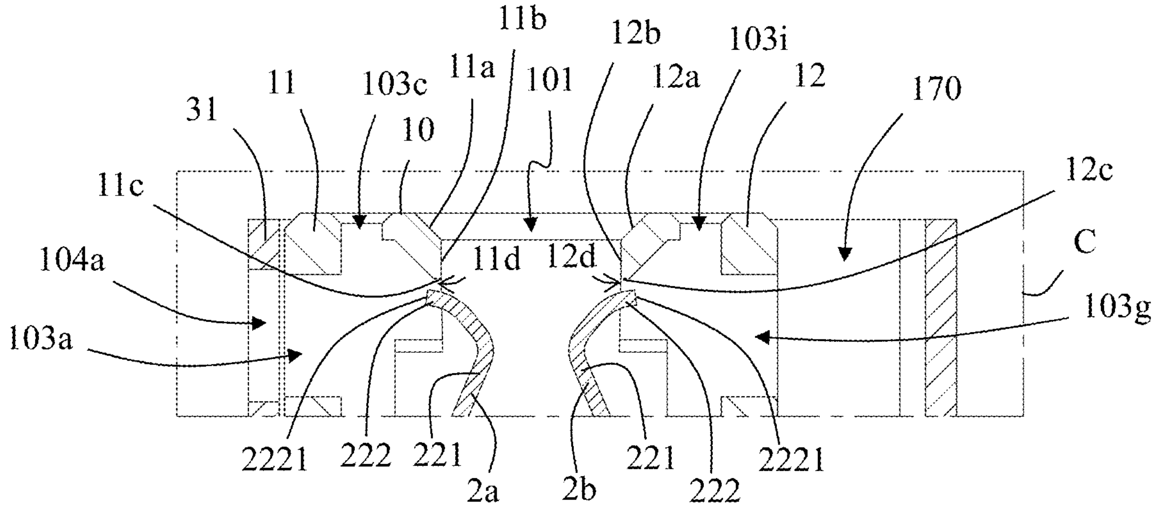
FIG. 26 is a partially enlarged view of a frame part C in FIG. 25.

Referring to FIG. 25 and FIG. 26, the first wall portion 11 includes a first guiding inclined surface 11*a* connected to the mating surface 10, a first inner wall surface 11*b* connected to the first guiding inclined surface 11*a* and extending along the first direction A1-A1, and a first bottom surface 11$c$ connected to the first inner wall surface 11$b$.

Similarly, the second wall portion 12 includes a second guiding inclined surface 12$a$ connected to the mating surface 10, a second inner wall surface 12$b$ connected to the second guiding inclined surface 12$a$ and extending along the first direction A1-A1, and a second bottom surface 12$c$ connected to the second inner wall surface 12$b$.

Figure 6:
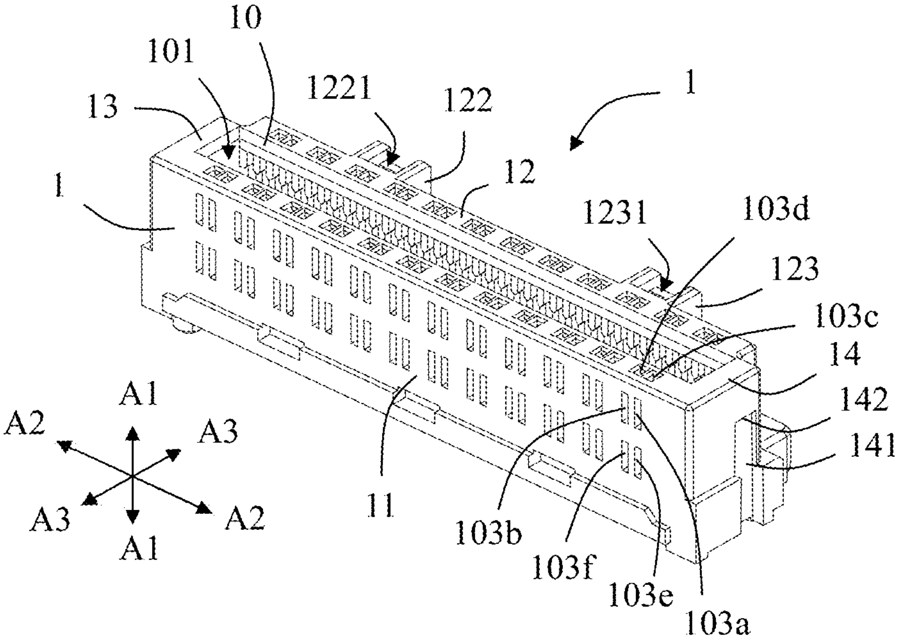
FIG. 6 is a perspective schematic view of an insulating body in FIG. 3.

Referring to FIG. 6, in the illustrated embodiment of the present disclosure, the cooling liquid circulation grooves 103 include a plurality of first cooling liquid circulation grooves 103$a$ provided on the first wall portion 11 and extending through the first wall portion 11, and a plurality of second cooling liquid circulation grooves 103$b$ provided on the first wall portion 11 and extending through the first wall portion 11. The first cooling liquid circulation grooves 103$a$ and the second cooling liquid circulation grooves 103$b$ that are located adjacent to each other form a group. The first cooling liquid circulation groove 103$a$ and the second cooling liquid circulation groove 103$b$ are disposed at intervals along a second direction A2-A2 (for example, a left-right direction). Both the first cooling liquid circulation groove 103$a$ and the second cooling liquid circulation groove 103$b$ extend through the first wall portion 11 along a third direction A3-A3 (for example, a front-rear direction). The third direction A3-A3 is perpendicular to the first direction A1-A1 and the second direction A2-A2.

In the illustrated embodiment of the present disclosure, the cooling liquid circulation groove 103 include a plurality of third cooling liquid circulation grooves 103$c$ which are provided on the first wall portion 11 and extend upwardly through the mating surface 10 along the first direction A1-A1, and a plurality of fourth cooling liquid circulation grooves 103$d$ which are provided on the first wall portion 11 and extend upwardly through the mating surface 10 along the first direction A1-A1. The third cooling liquid circulation groove 103$c$ and the fourth cooling liquid circulation groove 103$d$ that are located adjacent to each other form a group. In the group, the third cooling liquid circulation groove 103$c$ and the fourth cooling liquid circulation groove 103$d$ are disposed at intervals along the second direction A2-A2. The third cooling liquid circulation groove 103$c$ communicates with the first cooling liquid circulation groove 103$a$. The third cooling liquid circulation groove 103$c$ is perpendicular to the first cooling liquid circulation groove 103$a$. The fourth cooling liquid circulation groove 103$d$ communicates with the second cooling liquid circulation groove 103$b$. The fourth cooling liquid circulation groove 103$d$ is perpendicular to the second cooling liquid circulation groove 103$b$.

In order to further improve heat dissipation, the cooling liquid circulation grooves 103 further include a plurality of fifth cooling liquid circulation grooves 103$e$ which are provided on the first wall portion 11 and extend through the first wall portion 11, and a plurality of sixth cooling liquid circulation grooves 103$f$ which are provided on the first wall portion 11 and extend through the first wall portion 11. The fifth cooling liquid circulation groove 103$e$ and the sixth cooling liquid circulation groove 103$f$ that are located adjacent to each other form a group. In the group, the fifth cooling liquid circulation groove 103$e$ and the sixth cooling liquid circulation groove 103$f$ are disposed at intervals along the second direction A2-A2. The fifth cooling liquid circulation groove 103$e$ and the first cooling liquid circulation groove 103$a$ are disposed at intervals and aligned with each other along the first direction A1-A1. The sixth cooling liquid circulation groove 103$f$ and the second cooling liquid circulation groove 103$b$ are disposed at intervals and aligned with each other along the first direction A1-A1.

Figure 7:
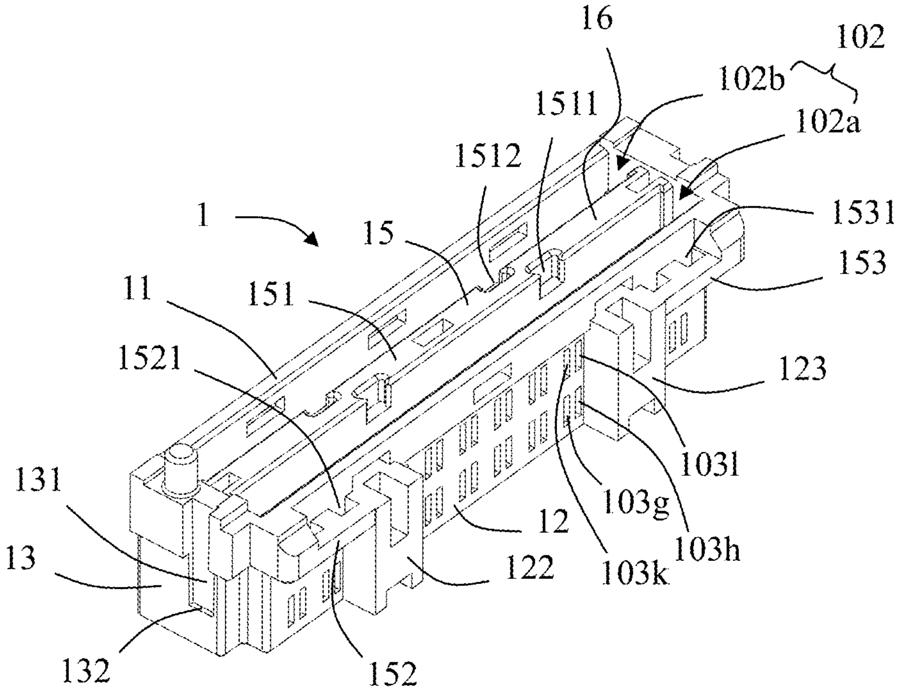
FIG. 7 is a schematic perspective view of FIG. 6 from another angle.
Figure 8:
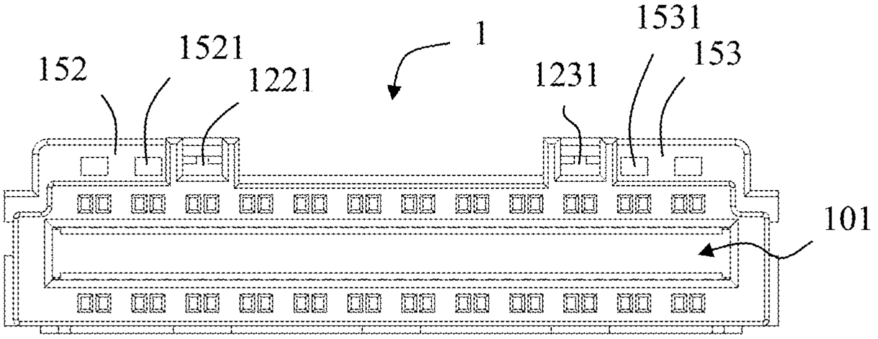
FIG. 8 is a top view of FIG. 6.
Figure 9:
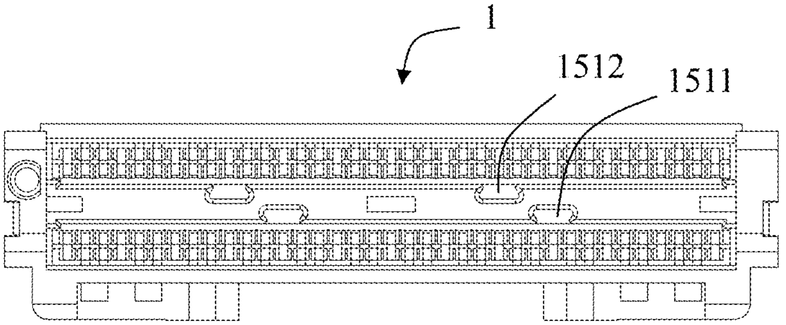
FIG. 9 is a bottom view of FIG. 6.

Referring to FIG. 6 to FIG. 8, the second wall portion 12 includes a main body portion 121, a first support portion 122 protruding away from the first wall portion 11 from the main body portion 121 along the third direction A3-A3, and a second support portion 123 protruding away from the first wall portion 11 from the main body portion 121 along the third direction A3-A3. The first support portion 122 and the second support portion 123 are disposed at intervals along the second direction A2-A2. The first support portion 122 defines a first fixing groove 1221 extending upwardly therethrough. The second support portion 123 defines a second fixing groove 1231 extending upwardly therethrough.

In the illustrated embodiment of the present disclosure, the cooling liquid circulation grooves 103 include a plurality of seventh cooling liquid circulation grooves 103$g$ which are provided on the second wall portion 12 and extend through the second wall portion 12, and a plurality of eighth cooling liquid circulation grooves 103$h$ which are provided on the second wall portion 12 and extend through the second wall portion 12. The seventh cooling liquid circulation groove 103$g$ and the eighth cooling liquid circulation groove 103$h$ that are located adjacent to each other form a group. In the group, the seventh cooling liquid circulation groove 103$g$ and the eighth cooling liquid circulation groove 103$h$ are disposed at intervals along the second direction A2-A2. Both the seventh cooling liquid circulation groove 103$g$ and the eighth cooling liquid circulation groove 103$h$ communicate with the mating slot 101 along the third direction A3-A3.

In the illustrated embodiment of the present disclosure, the cooling liquid circulation grooves 103 include a plurality of ninth cooling liquid circulation grooves 103$i$ which are provided on the second wall portion 12 and extend upwardly through the mating surface 10 along the first direction A1-A1, and a plurality of tenth cooling liquid circulation grooves 103$j$ which are provided on the second wall portion 12 and extend upwardly through the mating surface 10 along the first direction A1-A1. The ninth cooling liquid circulation groove 103$i$ and the tenth cooling liquid circulation groove 103$j$ that are located adjacent to each other form a group. In the group, the ninth cooling liquid circulation groove 103$i$ and the tenth cooling liquid circulation groove 103$j$ are disposed at intervals along the second direction A2-A2. The ninth cooling liquid circulation groove 103$i$ communicates with the seventh cooling liquid circulation groove 103$g$. The ninth cooling liquid circulation groove 103$i$ is perpendicular to the seventh cooling liquid circulation groove 103$g$. The tenth cooling liquid circulation groove 103$j$ communicates with the eighth cooling liquid circulation groove 103$h$. The tenth cooling liquid circulation groove 103$j$ is perpendicular to the eighth cooling liquid circulation groove 103$h$.

In order to further improve heat dissipation, the cooling liquid circulation grooves 103 further include a plurality of eleventh cooling liquid circulation grooves 103$k$ which are provided on the second wall portion 12 and extend through the second wall portion 12, and a plurality of twelfth cooling liquid circulation grooves 103$l$ which are provided on the second wall portion 12 and extend through the second wall portion 12. The eleventh cooling liquid circulation groove 103$k$ and the twelfth cooling liquid circulation groove 103$l$ that are located adjacent to each other form a group. In the group, the eleventh cooling liquid circulation groove 103$k$ and the twelfth cooling liquid circulation groove 103$l$ are disposed at intervals along the second direction A2-A2. The eleventh cooling liquid circulation groove 103$k$ and the seventh cooling liquid circulation groove 103*g* are disposed at intervals and aligned with each other along the first direction A1-A1. The twelfth cooling liquid circulation groove 103*l* and the eighth cooling liquid circulation groove 103*h* are disposed at intervals and aligned with each other along the first direction A1-A1.

Preferably, in the illustrated embodiment of the present disclosure, the first cooling liquid circulation groove 103*a* and the seventh cooling liquid circulation groove 103*g* at corresponding positions are symmetrically disposed on two sides of the mating slot 101. The second cooling liquid circulation groove 103*b* and the eighth cooling liquid circulation groove 103*h* at corresponding positions are symmetrically disposed on two sides of the mating slot 101. The third cooling liquid circulation groove 103*c* and the ninth cooling liquid circulation groove 103*i* at corresponding positions are symmetrically disposed on two sides of the mating slot 101. The fourth cooling liquid circulation groove 103*d* and the tenth cooling liquid circulation groove 103*j* at corresponding positions are symmetrically disposed on two sides of the mating slot 101. The fifth cooling liquid circulation groove 103*e* and the eleventh cooling liquid circulation groove 103*k* at corresponding positions are symmetrically disposed on two sides of the mating slot 101. The sixth cooling liquid circulation groove 103*f* and the twelfth cooling liquid circulation groove 103*l* at corresponding positions are symmetrically disposed on two sides of the mating slot 101.

Referring to FIG. 7, the third wall portion 13 defines a first locking groove 131 and a first locking surface 132 located at the top of the first locking groove 131.

Similarly, as shown in FIG. 6, the fourth wall portion 14 defines a second locking groove 141 and a second locking surface 142 located at the top of the second locking groove 141. Both the first locking surface 132 and the second locking surface 142 are located below the mating surface 10.

Referring to FIG. 7, in the illustrated embodiment of the present disclosure, the wall portions include a bottom wall 15 which is at least partially located at the bottom of the mating slot 101. The installation surface 16 is located on a lower surface of the bottom wall 15 and is disposed opposite to the mating surface 10. The installation slot 102 is provided on the bottom wall 15. The installation slot 102 communicates with the mating slot 101.

In the illustrated embodiment of the present disclosure, the installation slot 102 includes a first installation slot 102*a* communicating with the mating slot 101 and a second installation slot 102*b* communicating with the mating slot 101. The first installation slot 102*a* and the second installation slot 102*b* are disposed at intervals along the third direction A3-A3. In other words, the bottom wall 15 includes a partition wall 151 located between the first installation slot 102*a* and the second installation slot 102*b*. A side of the partition wall 151 exposed to the first installation slot 102*a* is recessed with a plurality of first dovetail grooves 1511 communicating with the first installation slot 102*a*. A side of the partition wall 151 exposed to the second installation slot 102*b* is recessed with a plurality of second dovetail grooves 1512 communicating with the second installation slot 102*b*.

In addition, referring to FIG. 7 and FIG. 8, the bottom wall 15 further includes a first extending bottom wall 152 extending away from the first wall portion 11 and a second extending bottom wall 153 extending away from the first wall portion 11. The first extending bottom wall 152 is located outside the second installation slot 102*b* and connected to the first support portion 122. The second extending bottom wall 153 is located outside the second installation slot 102*b* and connected to the second support portion 123. The first extending bottom wall 152 defines at least one first cooling liquid circulation opening 1521 extending through the first extending bottom wall 152 along the first direction A1-A1. The second extending bottom wall 153 defines at least one second cooling liquid circulation opening 1531 extending through the second extending bottom wall 153 along the first direction A1-A1.

Figure 2:
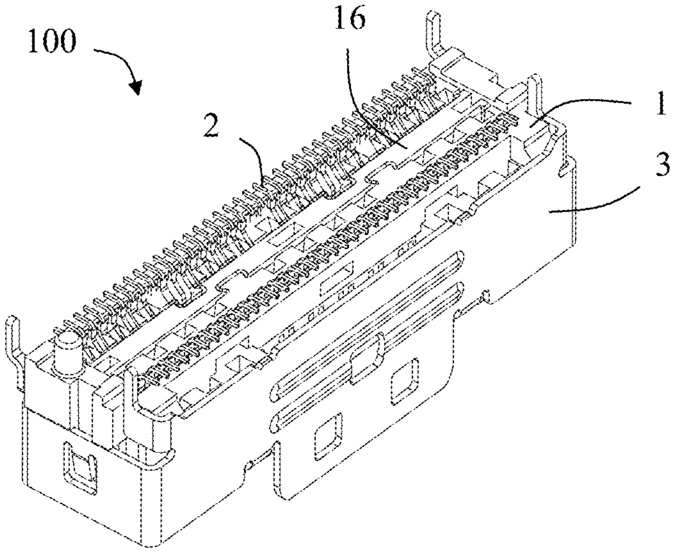
FIG. 2 is a schematic perspective view of FIG. 1 from another angle.
Figure 3:
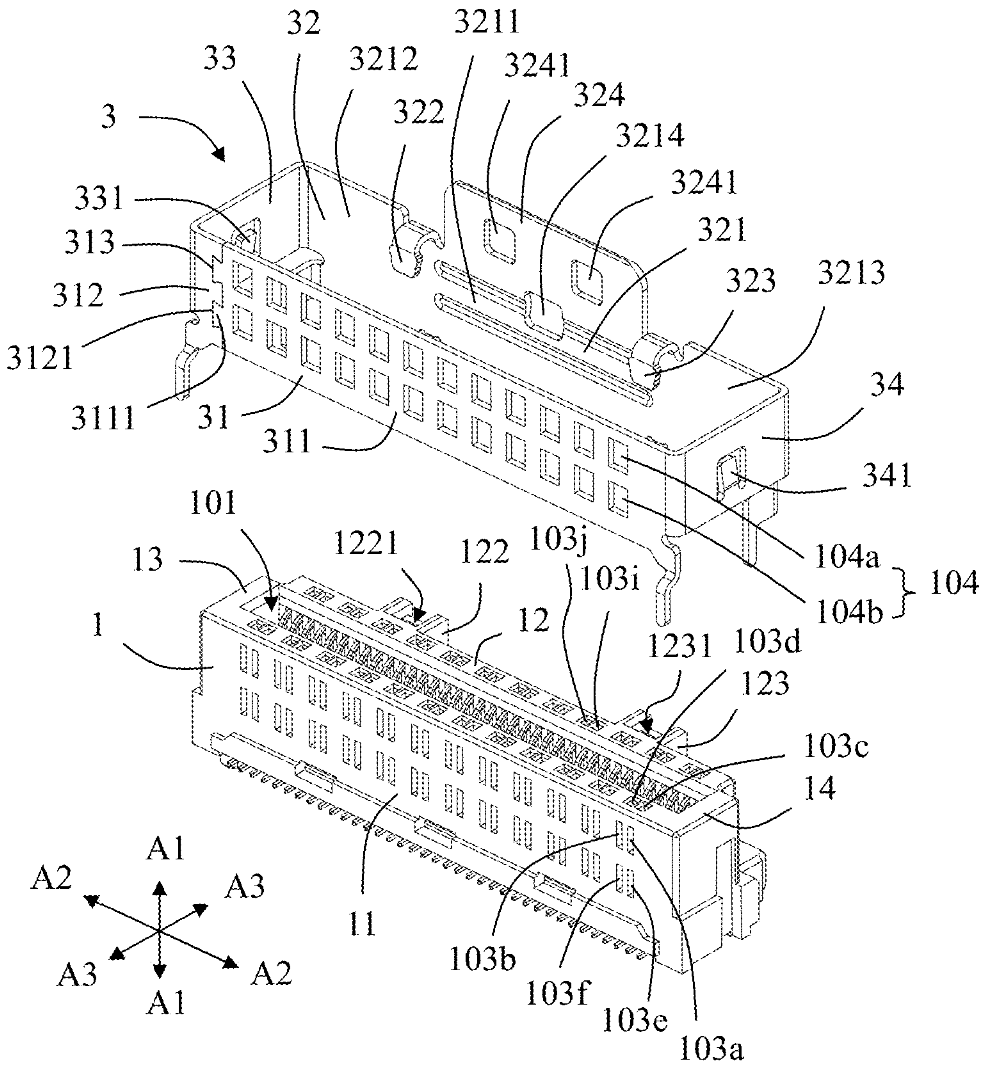
FIG. 3 is a partial perspective exploded view of FIG. 1.
Figure 4:
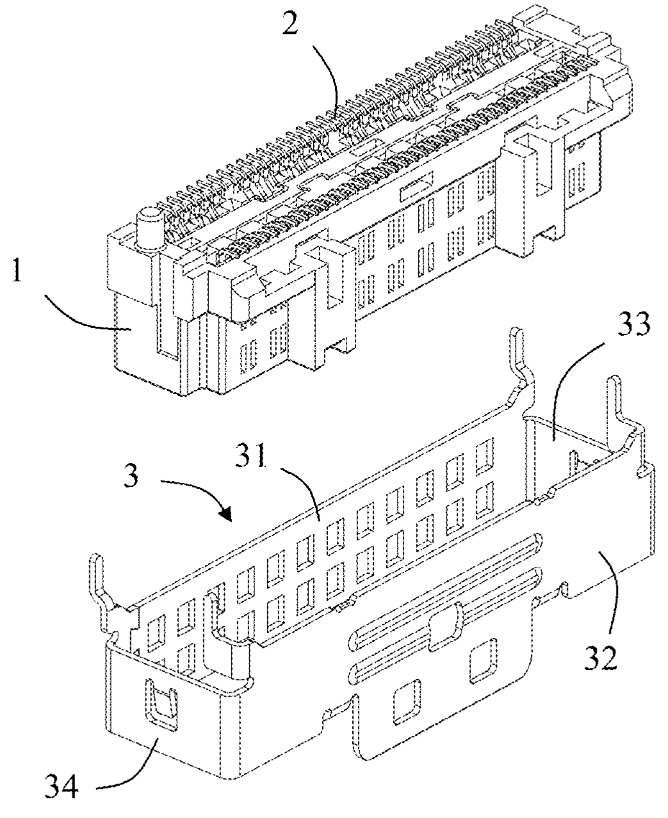
FIG. 4 is a partial perspective exploded view of FIG. 3 from another angle.

Referring to FIG. 1 to FIG. 3, the metal shell 3 includes a plurality of outer walls covering the insulating body 1. At least one of the plurality of outer walls defines at least one cooling liquid circulation slot 104 communicating with the cooling liquid circulation groove 103.

In the illustrated embodiment of the present disclosure, the plurality of outer walls include a first outer wall 31 covering the first wall portion 11, a second outer wall 32 covering the second wall portion 12, a third outer wall 33 covering the third wall portion 13, and a fourth outer wall 34 covering the fourth wall portion 14. In the illustrated embodiment of the present disclosure, the first outer wall 31, the second outer wall 32, the third outer wall 33 and the fourth outer wall 34 are formed by bending and fastening a metal sheet.

The first outer wall 31 includes a first outer wall portion 311 and a second outer wall portion 312 snapped and fixed together with the first outer wall portion 311. In the illustrated embodiment of the present disclosure, a joint 313 of the first outer wall portion 311 and the second outer wall portion 312 is provided with a dovetail protrusion 3111 and a dovetail groove 3121 that are interlocked with each other. In the illustrated embodiment of the present disclosure, the joint 313 is not located in a middle of the first outer wall 31, but is located adjacent to the third wall portion 13 of the first outer wall 31. In other words, a dimension of the first outer wall portion 311 along the second direction A2-A2 is much larger than a dimension of the second outer wall portion 312 along the second direction A2-A2.

Figure 10:
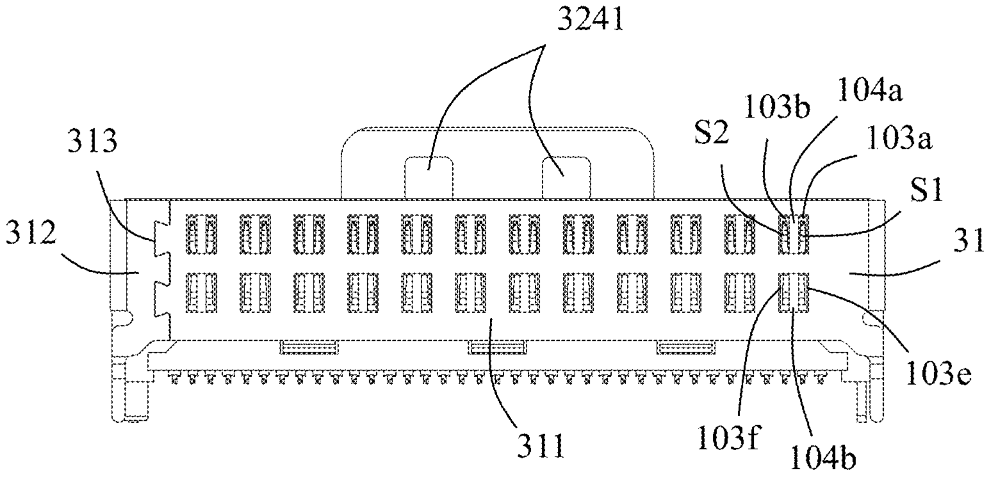
FIG. 10 is a front view of FIG. 1.
Figure 11:
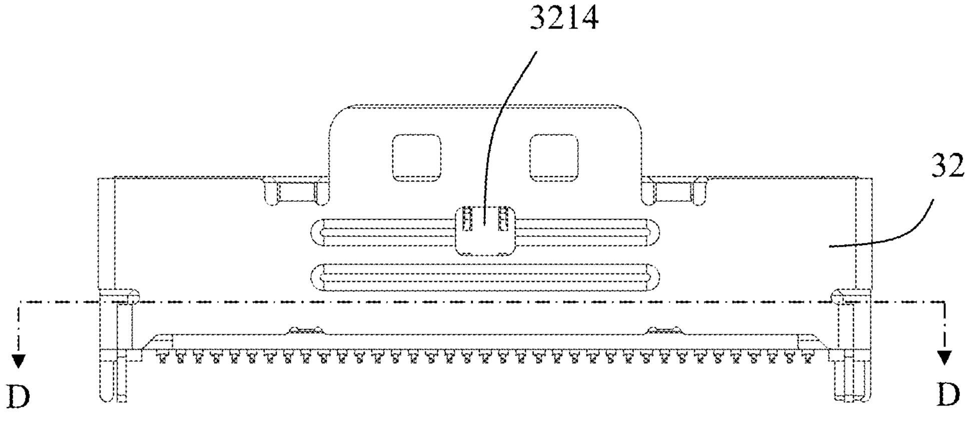
FIG. 11 is a rear view of FIG. 1.
Figure 12:
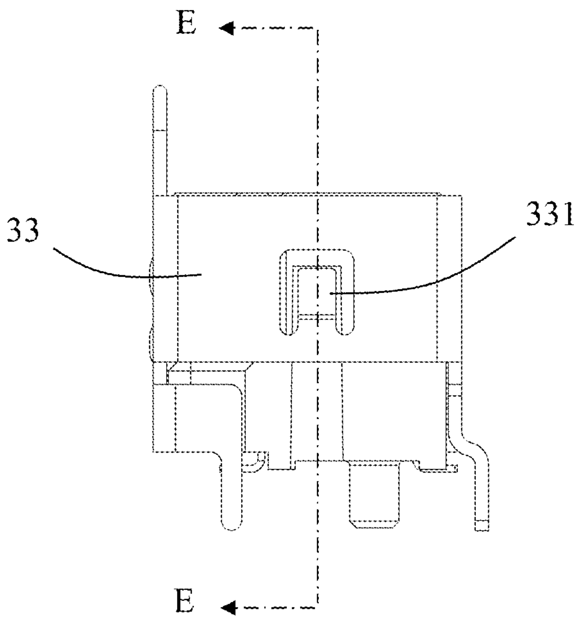
FIG. 12 is a left view of FIG. 1.
Figure 13:
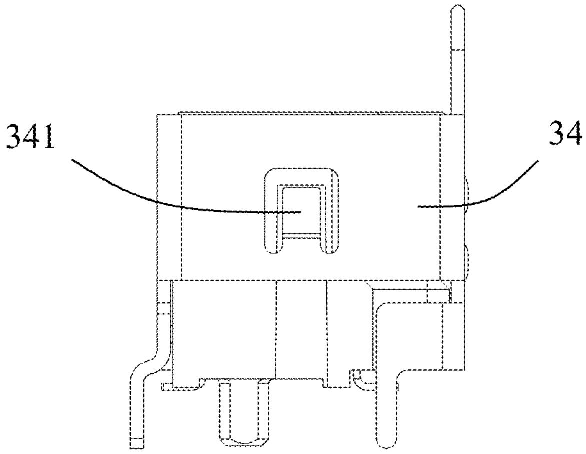
FIG. 13 is a right view of FIG. 1.

In the illustrated embodiment of the present disclosure, the cooling liquid circulation slots 104 include a plurality of first cooling liquid circulation slots 104*a* which are provided on the first outer wall 31 and extend through the first outer wall 31 along the third direction A3-A3. The plurality of first cooling liquid circulation slots 104*a* are disposed at intervals along the second direction A2-A2. Referring to FIG. 10, the first cooling liquid circulation groove 103*a* and the second cooling liquid circulation groove 103*b* forming a group are both exposed in a corresponding first cooling liquid circulation slot 104*a*.

In the illustrated embodiment of the present disclosure, the cooling liquid circulation slots 104 further includes a plurality of second cooling liquid circulation slots 104*b* which are provided on the first outer wall 31 and extend through the first outer wall 31 along the third direction A3-A3. The plurality of second cooling liquid circulation slots 104*b* are disposed at intervals along the second direction A2-A2. The plurality of first cooling liquid circulation slots 104*a* are located in a first row (for example, an upper row). The plurality of second cooling liquid circulation slots 104*b* are located in a second row (for example, a lower row) parallel to the first row. As shown in FIG. 10, the fifth cooling liquid circulation groove 103*e* and the sixth cooling liquid circulation groove 103*f* forming a group are both exposed in a corresponding second cooling liquid circulation slot 104*b*.

Referring to FIG. 3, in the embodiment illustrated in the present disclosure, the plurality of first cooling liquid circulation slots 104*a* and the plurality of second cooling liquid circulation slots 104*b* are located on the first outer wall portion 311. In other words, neither the second outer wall portion 312 nor the joint 313 of the first outer wall portion 311 and the second outer wall portion 312 is provided with the first cooling liquid circulation slot 104*a* or the second cooling liquid circulation slot 104*b*. The design of the first outer wall portion 311 and the second outer wall portion 312 in the present disclosure is beneficial to form the first cooling liquid circulation slot 104*a* and the second cooling liquid circulation slot 104*b* on the first outer wall portion 311 with a large area, avoiding the problems in manufacturing and structural strength caused when the first cooling liquid circulation slot 104*a* or the second cooling liquid circulation slot 104*b* are provided at the joint 313.

As shown in FIG. 3, the second outer wall 32 abuts against the first support portion 122 and the second support portion 123. The second outer wall 32 includes a body portion 321 supported on the first support portion 122 and the second support portion 123, a first fixing piece 322 bent inwardly from the body portion 321, and a second fixing piece 323 bent inwardly from the body portion 321. The first fixing piece 322 is fixed in the first fixing groove 1221. The second fixing piece 323 is fixed in the second fixing groove 1231.

The body portion 321 includes a middle portion 3211, a first extension portion 3212 connected to the middle portion 3211 and located on one side of the middle portion 3211, and a second extension portion 3213 connected to the middle portion 3211 and located on the other side of the middle portion 3211. In order to improve the structural strength of the middle portion 3211, the middle portion 3211 is further provided with a plurality of reinforcing ribs.

Figure 14:
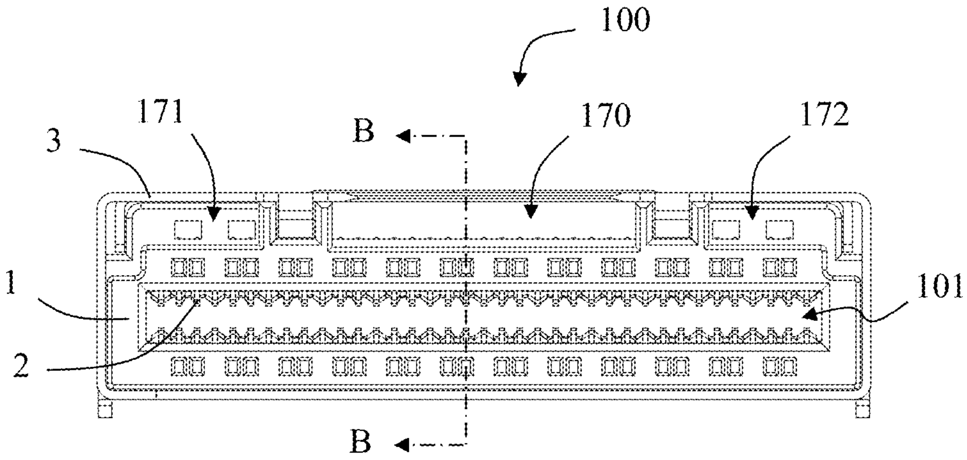
FIG. 14 is a top view of FIG. 1.
Figure 15:
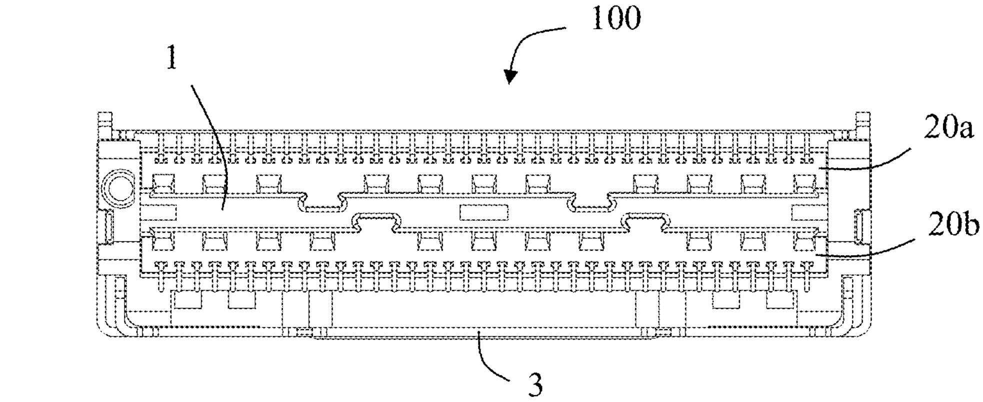
FIG. 15 is a bottom view of FIG. 1.
Figure 16:
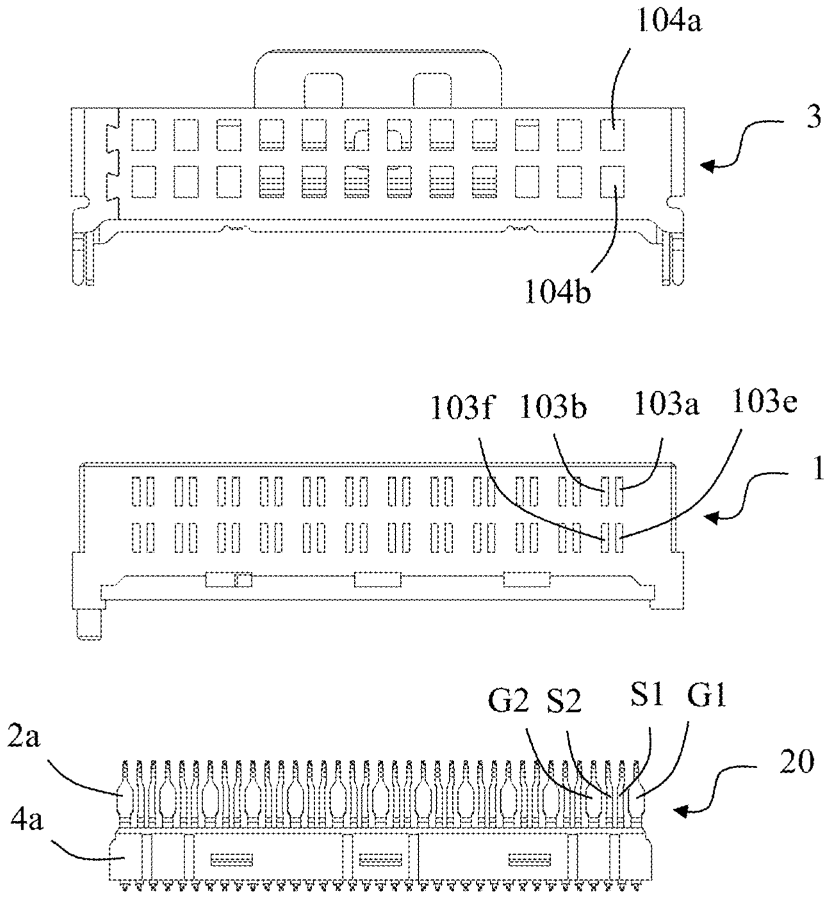
FIG. 16 is a front view of some components of the electrical connector of the present disclosure in an exploded state.
Figure 17:
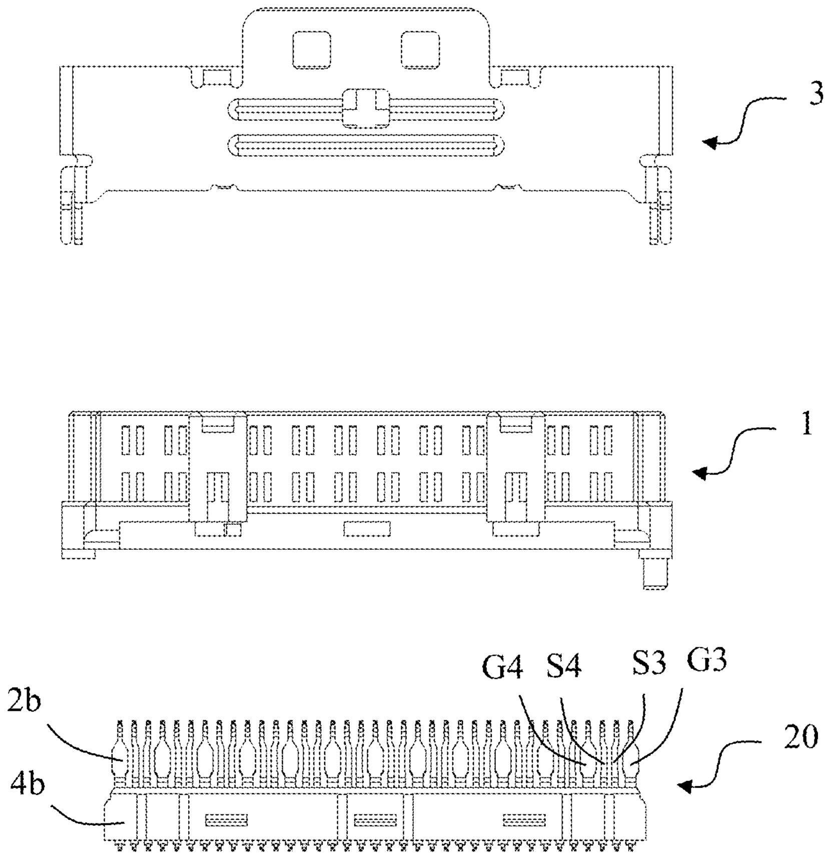
FIG. 17 is a rear view of FIG. 16.
Figure 18:
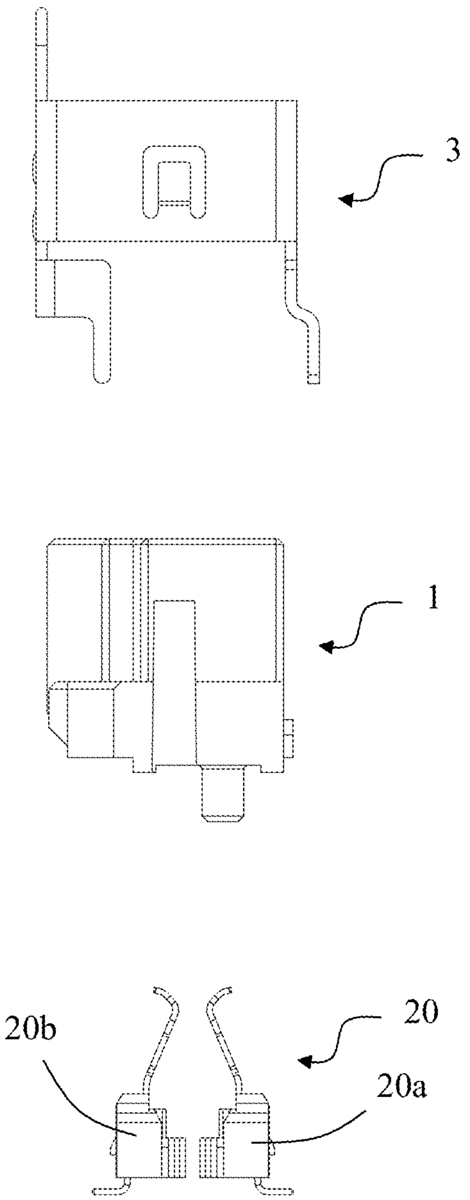
FIG. 18 is a left side view of FIG. 16.
Figure 19:
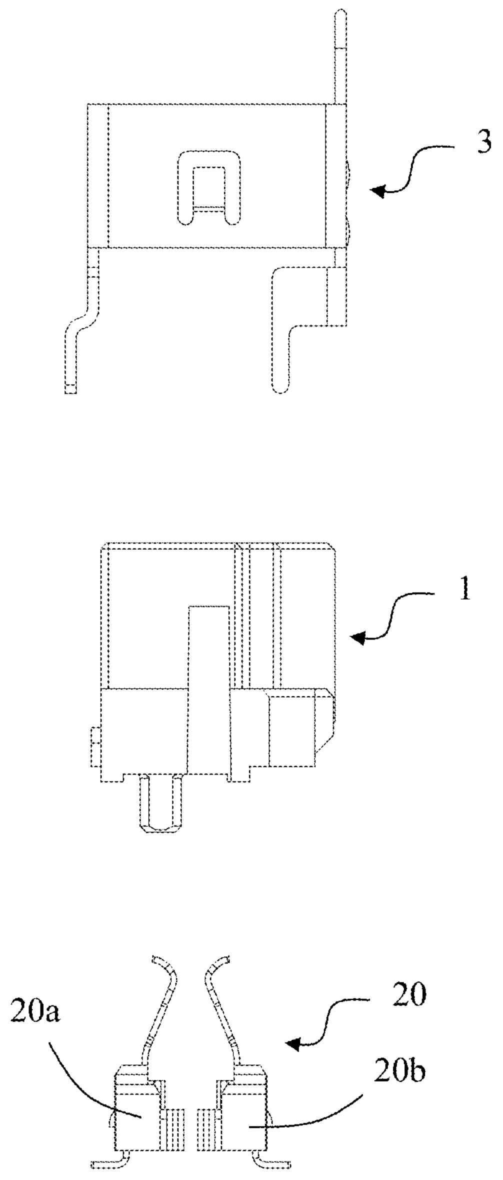
FIG. 19 is a right view of FIG. 16.

Referring to FIG. 1 and FIG. 14, in the embodiment illustrated in the present disclosure, the electrical connector 100 includes an accommodation space 170 enclosed by the first support portion 122, the second support portion 123, the main body portion 121 and the middle portion 3211. The accommodation space 170 is located outside the mating slot 101 for receiving a positioning protrusion (not shown) of the mating connector.

In the illustrated embodiment of the present disclosure, the electrical connector 100 further includes an L-shaped first cavity 171 surrounded by the second outer wall 32, the third outer wall 33, the main body portion 121 and the first support portion 122. The first extending bottom wall 152 is located at the bottom of the first cavity 171. The first cooling liquid circulation opening 1521 communicates with the first cavity 171.

Similarly, in the illustrated embodiment of the present disclosure, the electrical connector 100 further includes an L-shaped second cavity 172 surrounded by the second outer wall 32, the fourth outer wall 34, the main body portion 121 and the second support portion 123. The second extending bottom wall 153 is located at the bottom of the second cavity 172. The second cooling liquid circulation opening 1531 communicates with the second cavity 172.

Referring to FIG. 3, in the illustrated embodiment of the present disclosure, the second outer wall 32 is further provided with an extending protrusion 324 integrally extending from the middle portion 3211 of the body portion 321. The extending protrusion 324 protrudes beyond the mating surface 10. The extending protrusion 324 defines at least one locking hole 3241 extending through the extending protrusion 324 along the third direction A3-A3. The locking hole 3241 is configured to mate with a locking protrusion (not shown) of the mating connector. In the illustrated embodiment of the present disclosure, the accommodation space 170 communicates with the mating slot 101 through multiple groups of the seventh cooling liquid circulation grooves 103*g* and the eighth cooling liquid circulation grooves 103*h*. The first cavity 171 communicates with the mating slot 101 through at least one group of the seventh cooling liquid circulation groove 103*g* and the eighth cooling liquid circulation groove 103*h*. The second cavity 172 communicates with the mating slot 101 through at least one group of the seventh cooling liquid circulation groove 103*g* and the eighth cooling liquid circulation groove 103*h*.

In the illustrated embodiment of the present disclosure, the body portion 321 defines a plurality of cooling liquid circulation through holes 3214 extending through the body portion 321 along the third direction A3-A3. The cooling liquid circulation through holes 3214 communicate with the accommodation space 170.

Figure 29:
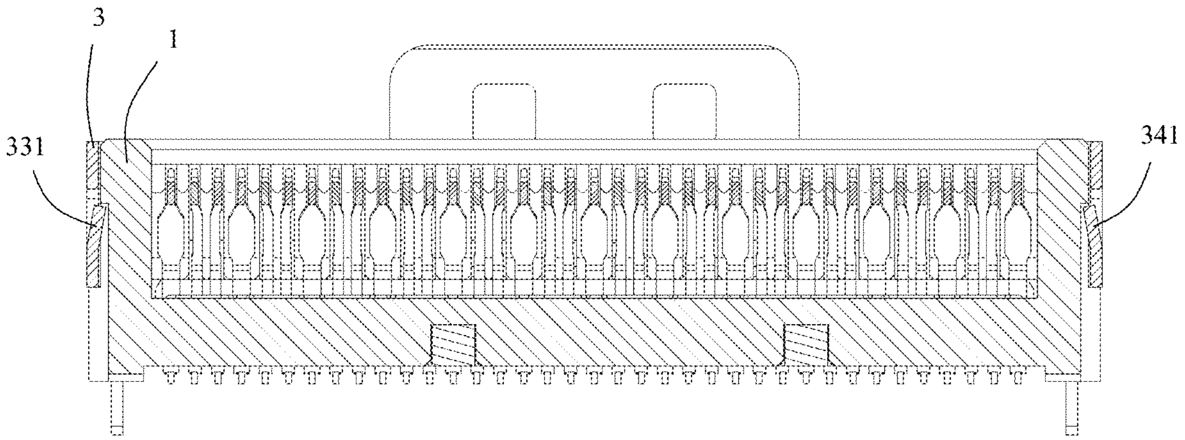
FIG. 29 is a schematic cross-sectional view taken along line E-E in FIG. 12.

Referring to FIG. 3 and FIG. 29, the third outer wall 33 includes a first tab 331 at least partially received in the first locking groove 131. The top of the first tab 331 abuts against the first locking surface 132 to prevent the third outer wall 33 from detaching upwardly from the third wall portion 13 of the insulating body 1 after installation. In the illustrated embodiment of the present disclosure, the first tab 331 is stamped inwardly from the third outer wall 33.

Similarly, the fourth outer wall 34 includes a second tab 341 at least partially received in the second locking groove 141. The top of the second tab 341 abuts against the second locking surface 142 to prevent the fourth outer wall 34 from detaching upwardly from the fourth wall portion 14 of the insulating body 1 after installation. In the illustrated embodiment of the present disclosure, the second tab 341 is stamped inwardly from the fourth outer wall 34.

Referring to FIG. 20 to FIG. 24, in the embodiment shown in the present disclosure, each conductive terminal 2 includes a fixing portion 21 fixed in a component, an elastic contact arm 22 extending from one end of the fixing portion 21, and a tail portion 23 extending from the other end of the fixing portion 21. The elastic contact arm 22 includes a contact portion 221 protruding into the mating slot 101 and configured to be electrically connected to the mating connector, and an end portion 222 connected to the contact portion 221. The end portion 222 has an end surface 2221.

Referring to FIG. 16 to FIG. 21, the electrical connector 100 includes a terminal module 20 installed in the installation slot 102 of the insulating body 1. In the illustrated embodiment of the present disclosure, the terminal module 20 includes a first terminal module 20*a* and a second terminal module 20*b*.

The first terminal module 20*a* includes a first insulating block 4*a*, a plurality of first conductive terminals 2*a* fixed to the first insulating block 4*a*, and a first metal grounding sheet 5*a* assembled to the first insulating block 4*a*.

Figure 5:
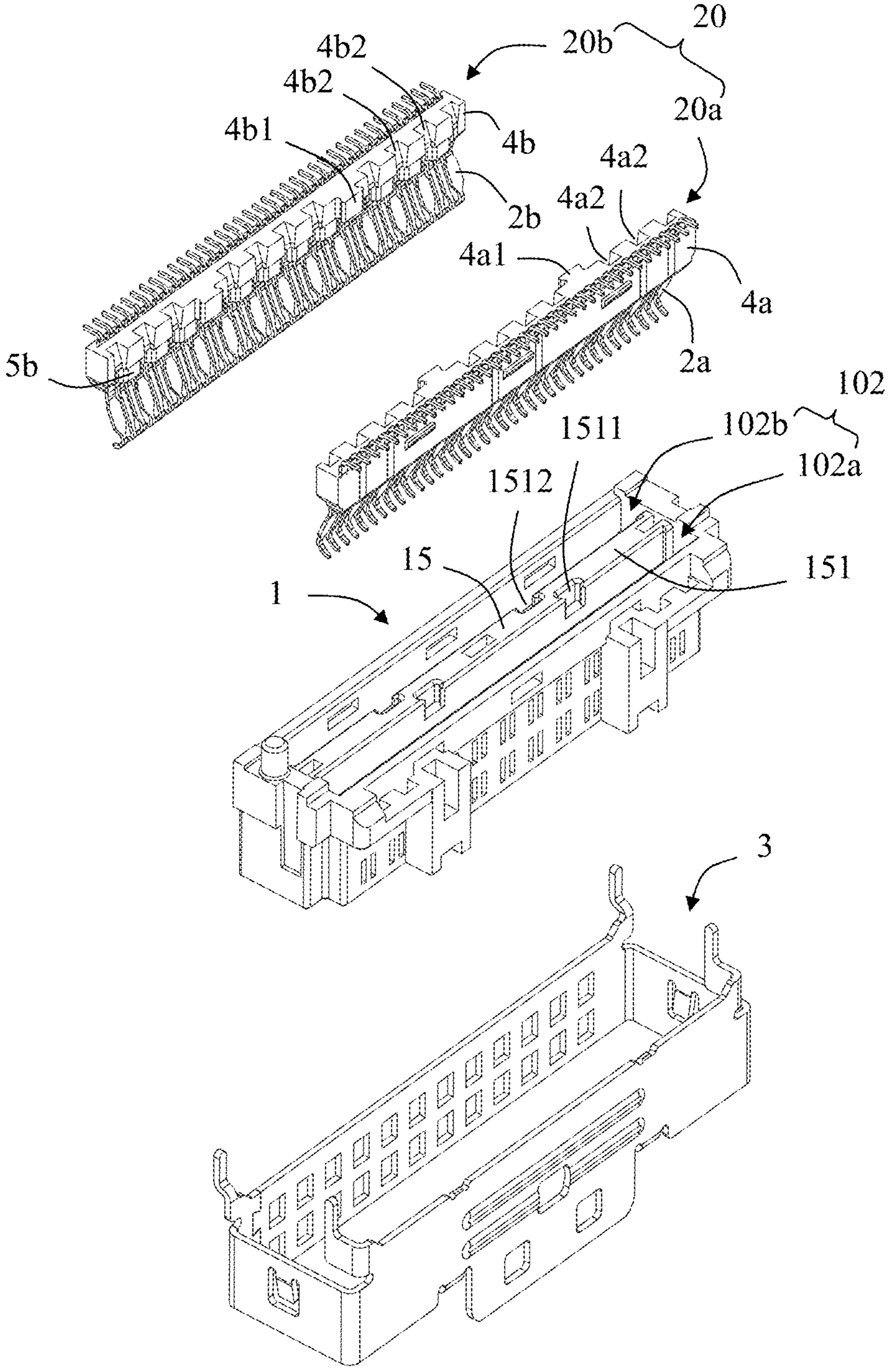
FIG. 5 is a further partial perspective exploded view of FIG. 4.

Referring to FIG. 5, the first insulating block 4*a* includes a plurality of first dovetail protrusions 4*a*1 for being inserted into the plurality of first dovetail slots 1511 and a plurality of first cooling liquid circulation holes 4*a*2 extending through the first insulating block 4*a* along the first direction A1-A1. The plurality of first cooling liquid circulation holes 4*a*2 are disposed at intervals along the second direction A2-A2.

Figure 24:
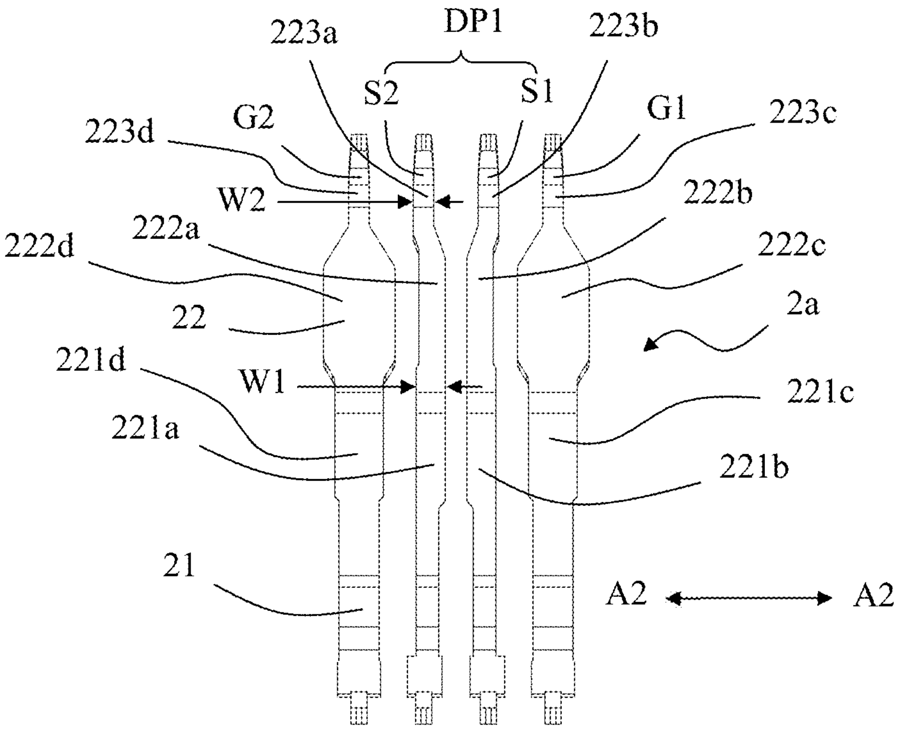
FIG. 24 is a left side view of a first differential pair signal terminals, a first ground terminal and a second ground terminal in FIG. 22.

In an embodiment of the present disclosure, the plurality of first conductive terminals 2*a* are insert-molded in the first insulating block 4*a*. As shown in FIG. 24, the plurality of first conductive terminals 2*a* include a plurality of first differential pair signal terminals DP1, a plurality of first ground terminals G1 of which each is located on one side of a corresponding first differential pair signal terminals DP1 along the second direction A2-A2, and a plurality of second ground terminals G2 of which each is located on the other side of the corresponding first differential pair signal terminals DP1 along the second direction A2-A2. Each first differential pair signal terminals DP1 include a first signal terminal S1 and a second signal terminal S2 which are disposed adjacently along the second direction A2-A2.

The fixing portion 21 of the first conductive terminal 2*a* is fixed to the first insulating block 4*a*. The elastic contact arm 22 of the first conductive terminal 2*a* extends out of the first insulating block 4*a*. The tail portion 23 of the first conductive terminal 2*a* is configured for being soldered and fixed to a circuit board (not shown).

In the embodiment shown in the present disclosure, the first differential pair signal terminals DP1 adopts a close coupling design. That is, a distance between the elastic contact arm 22 of the first signal terminal S1 and the elastic contact arm 22 of the second signal terminal S2 is smaller than a distance between the elastic contact arm 22 of the first signal terminal S1 and the elastic contact arm 22 of the first ground terminal G1, and is also smaller than a distance between the elastic contact arm 22 of the second signal terminal S2 and the elastic contact arm 22 of the second ground terminal G2.

The elastic contact arm 22 of the first signal terminal S1 includes a first support section 221*a* connected to a corresponding fixing portion 21, a first inclined arm 222*a* connected to the first support section 221*a*, and a first contact portion 223*a* connected to the first inclined arm 222*a*.

The elastic contact arm 22 of the second signal terminal S2 includes a second support section 221*b* connected to a corresponding fixing portion 21, a second inclined arm 222*b* connected to the second support section 221*b*, and a second contact portion 223*b* connected to the second inclined arm 222*b*.

The elastic contact arm 22 of the first ground terminal G1 includes a third support section 221*c* connected to a corresponding fixing portion 21, a third inclined arm 222*c* connected to the third support section 221*c*, and a third contact portion 223*c* connected to the third inclined arm 222*c*.

The elastic contact arm 22 of the second ground terminal G2 includes a fourth support section 221*d* connected to a corresponding fixing portion 21, a fourth inclined arm 222*d* connected to the fourth support section 221*d*, and a fourth contact portion 223*d* connected to the fourth inclined arm 222*d*.

The first contact portion 223*a* of the first signal terminal S1 is offset to the outside compared with the first inclined arm 222*a* of the first signal terminal S1. The second contact portion 223*b* of the second signal terminal S2 is offset to the outside compared with the second inclined arm 222*b* of the second signal terminal S2. In other words, in the first differential pair signal terminals DP1, a distance between a centerline of the first contact portion 223*a* of the first signal terminal S1 and a centerline of the second contact portion 223*b* of the second signal terminal S2 is greater than a distance between a centerline of the first inclined arm 222*a* of the first signal terminal S1 and a centerline of the second inclined arm 222*b* of the second signal terminal S2.

A width of the third inclined arm 222*c* of the first ground terminal G1 along the second direction A2-A2 is generally larger than a width of the first inclined arm 222*a* of each of the first signal terminals S1 along the second direction A2-A2, and is also larger than a width of the second inclined arm 222*b* of each of the second signal terminals S2 along the second direction A2-A2. With such arrangement, the first ground terminal G1 and the second ground terminal G2 can better shield the first differential pair signal terminals DP1 therebetween, thereby improving the quality of signal transmission.

Figure 20:
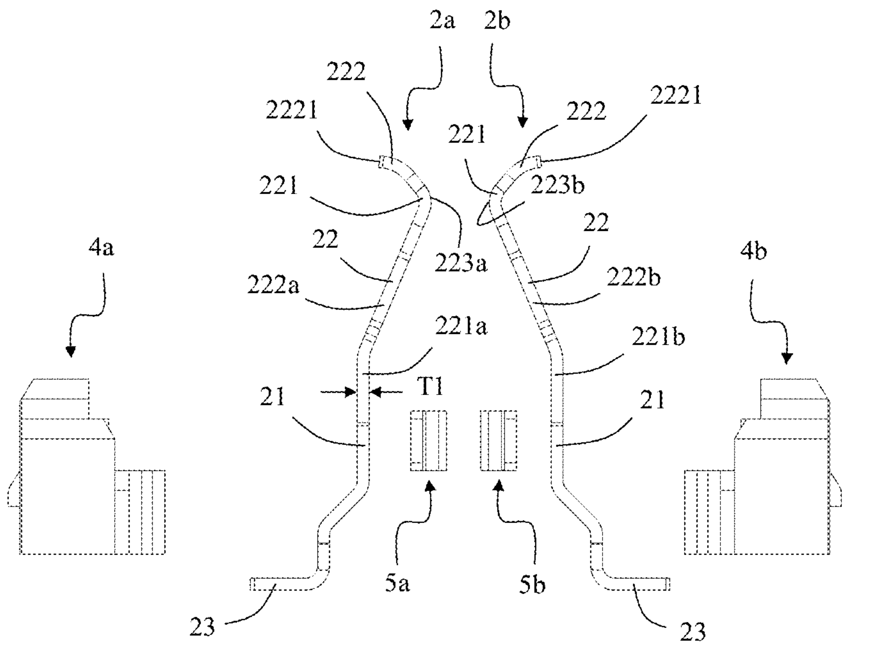
FIG. 20 is an exploded schematic view of a first terminal module and a second terminal module in FIG. 19.

Referring to FIG. 20 and FIG. 24, in the embodiment shown in the present disclosure, as far as the first signal terminal S1 is concerned, the first support section 221*a* has a first width W1 along the second direction A2-A2; the first contact portion 223*a* has a second width W2 along the second direction A2-A2; the first support section 221*a* has a first thickness T1 along the third direction A3-A3; wherein $W1-W2 \leq 0.1$ mm; $W1/W2 \leq 29/19$; and $W1/T1 \leq 9/5$. The above parameters of the first signal terminal S1 enable the first signal terminal S1 to maintain better signal integrity when transmitting signals, thereby meeting design requirements.

It is understandable to those skilled in the art that the proportional relationship between the second support section 221*b* and the second contact portion 223*b* on the second signal terminal S2 is the same as that of the first signal terminal S1, and will not be repeated in the present disclosure.

Figure 21:
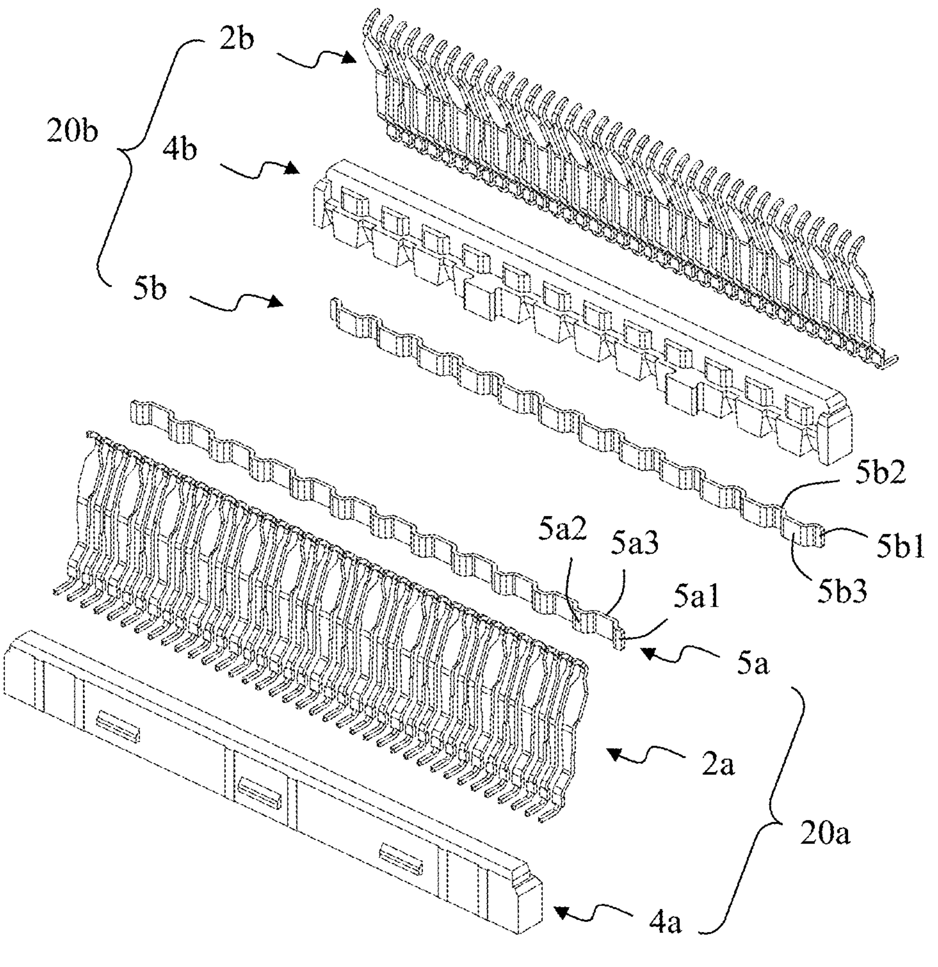
FIG. 21 is a perspective exploded view of the first terminal module and the second terminal module.
Figure 22:
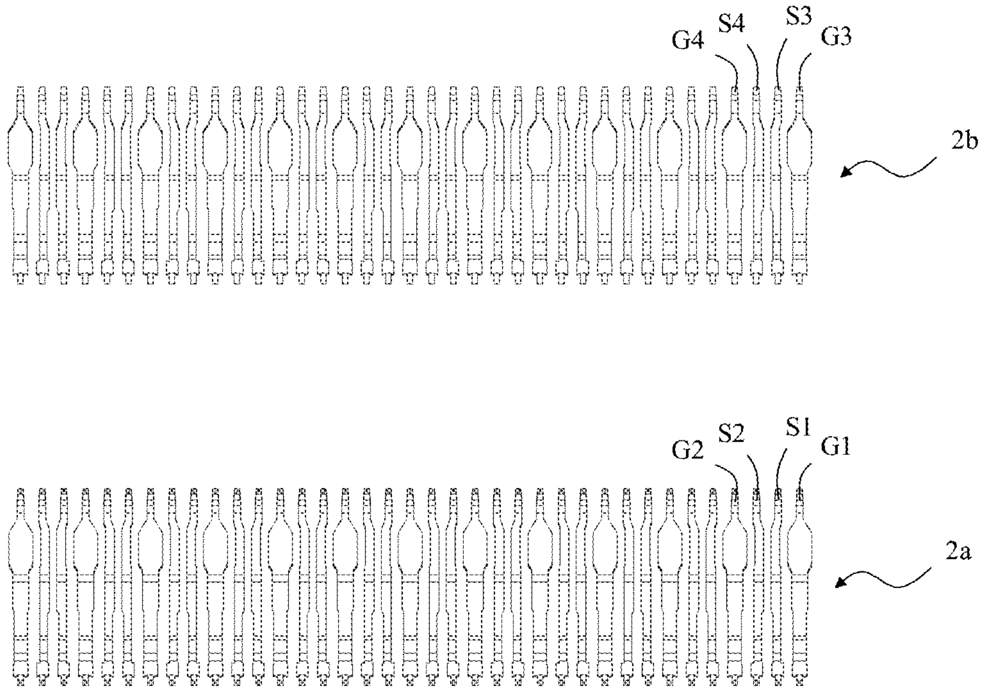
FIG. 22 is a left view of a plurality of first conductive terminals and a plurality of second conductive terminals in FIG. 21.
Figure 28:
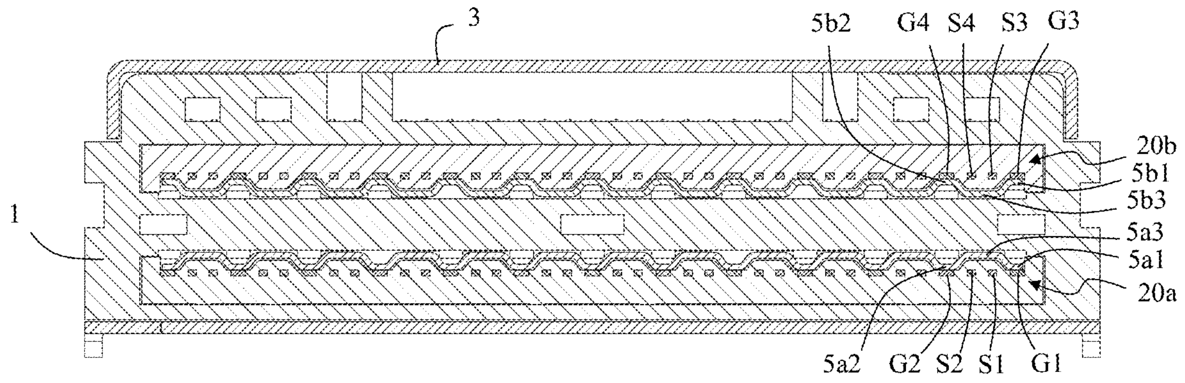
FIG. 28 is a schematic cross-sectional view taken along line D-D in FIG. 11.

Referring to FIG. 21 and FIG. 28, the first metal grounding sheet 5*a* is wave-shaped, which includes a plurality of first abutting portions 5*a*1, a plurality of second abutting portions 5*a*2, and a plurality of first raised portions 5*a*3. Each first raised portion 5*a*3 connects an adjacent first abutting portion 5*a*1 and an adjacent second abutting portion 5*a*2. The first abutting portion 5*a*1 is in contact with the third support section 221*c* of the first ground terminal G1; and the second abutting portion 5*a*2 is in contact with the fourth support section 221*d* of the second ground terminal G2. As a result, all the first ground terminals G1 and all the second ground terminals G2 are connected in series, so as to play a better role of ground shielding. Each first raised portion 5*a*3 avoids a corresponding first differential pair signal terminals DP1 so as to prevent a short circuit due to contact.

Referring to FIG. 5, the second terminal module 20*b* includes a second insulating block 4*b*, a plurality of second conductive terminals 2*b* fixed to the second insulating block 4*b*, and a second metal grounding sheet 5*b* assembled to the second insulating block 4*b*.

The second insulating block 4*b* includes a plurality of second dovetail protrusions 4*b*1 for being inserted into the plurality of second dovetail grooves 1512, and a plurality of second cooling liquid circulation holes 4*b*2 extending through the second insulating block 4*b* along the first direction A1-A1. The plurality of second cooling liquid circulation holes 4*b*2 are disposed at intervals along the second direction A2-A2.

Figure 23:
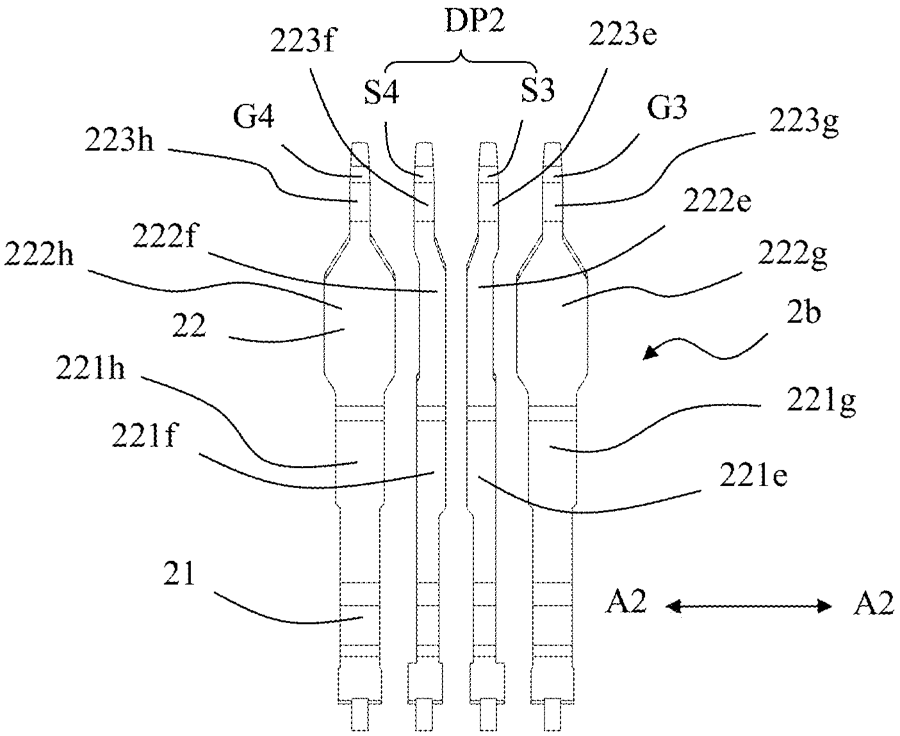
FIG. 23 is a left side view of a second differential pair signal terminals, a third ground terminal and a fourth ground terminal in FIG. 22.

Referring to FIG. 23, in an embodiment of the present disclosure, the plurality of second conductive terminals 2*b* are insert-molded in the second insulating block 4*b*. The plurality of second conductive terminals 2*b* include a plurality of second differential pair signal terminals DP2, a plurality of third ground terminals G3 of which each is located on one side of a corresponding second differential pair signal terminals DP2 along the second direction A2-A2, and a plurality of fourth ground terminals G4 of which each is located on the other side of the corresponding second differential pair signal terminals DP2 along the second direction A2-A2. Each second differential pair signal terminals DP2 include a third signal terminal S3 and a fourth signal terminal S4 which are disposed adjacently along the second direction A2-A2.

The fixing portion 21 of the second conductive terminal 2*b* is fixed to the second insulating block 4*b*. The elastic contact arm 22 of the second conductive terminal 2*b* extends out of the second insulating block 4*b*. The tail portion 23 of the second conductive terminal 2*b* is configured for being soldered and fixing to the circuit board (not shown).

The elastic contact arm 22 of the third signal terminal S3 includes a fifth support section 221*e* connected to a corresponding fixing portion 21, a fifth inclined arm 222*e* connected to the fifth support section 221*e*, and a fifth contact portion 223*e* connected to the fifth inclined arm 222*e*.

The elastic contact arm 22 of the fourth signal terminal S4 includes a sixth support section 221*f* connected to a corresponding fixing portion 21, a sixth inclined arm 222*f* connected to the sixth support section 221*f*, and a sixth contact portion 223*f* connected to the sixth inclined arm 222*f*.

The elastic contact arm 22 of the third ground terminal G3 includes a seventh support section 221*g* connected to a corresponding fixing portion 21, a seventh inclined arm 222*g* connected to the seventh support section 221*g*, and a seventh contact portion 223*g* connected to the seventh inclined arm 222*g*.

The elastic contact arm 22 of the fourth ground terminal G4 includes an eighth support section 221*h* connected to a corresponding fixing portion 21, an eighth inclined arm 222*h* connected to the eighth support section 221*h*, and an eighth contact portion 223*h* connected to the eighth inclined arm 222*h*.

The fifth contact portion 223*e* of the third signal terminal S3 is offset to the outside compared with the fifth inclined arm 222*e* of the third signal terminal S3. The sixth contact portion 223*f* of the fourth signal terminal S4 is offset to the outside compared with the sixth inclined arm 222*f* of the fourth signal terminal S4. In other words, in the second differential pair signal terminals DP2, a distance between the centerline of the fifth contact portion 223*e* of the third signal terminal S3 and a centerline of the sixth contact portion 223*f* of the fourth signal terminal S4 is greater than a distance between a centerline of the fifth inclined arm 222*e* of the third signal terminal S3 and a centerline of the sixth inclined arm 222*f* of the fourth signal terminal S4.

A width of the seventh inclined arm 222*g* of the third ground terminal G3 along the second direction A2-A2 is generally larger than a width of the fifth inclined arm 222*e* of each of the third signal terminals S3 along the second direction A2-A2, and is also larger than a width of the sixth inclined arm 222*f* of each of the fourth signal terminals S4 along the second direction A2-A2. With such arrangement, the third ground terminal G3 and the fourth ground terminal G4 can better shield the second differential pair signal terminals DP2 therebetween, thereby improving the quality of signal transmission.

Referring to FIG. 21 and FIG. 28, the second metal grounding sheet 5*b* is wave-shaped, which includes a plurality of third abutting portions 5*b*1, a plurality of fourth abutting portions 5*b*2, and a plurality of second raised portions 5*b*3. Each second raised portion 5*b*3 connects an adjacent third abutting portion 5*b*1 and an adjacent the fourth abutting portion 5*b*2. The third abutting portion 5*b*1 is in contact with the seventh support section 221*g* of the third ground terminal G3, and the fourth abutting portion 5*b*2 is in contact with the eighth support section 221*h* of the fourth ground terminal G4. As a result, all the third ground terminals G3 and all the fourth ground terminals G4 are connected in series, so as to play a better role of ground shielding. Each second raised portion 5*b*3 avoids the second differential pair signal terminals DP2 so as to prevent a short circuit due to contact.

In the illustrated embodiment of the present disclosure, the differential pair signal terminals are exposed to the outside of the electrical connector 100 through the cooling liquid circulation grooves 103 and the cooling liquid circulation slots 104 so as to achieve a better heat dissipation effect. In other words, the differential pair signal terminals can be observed from the outside of the electrical connector 100 through the cooling liquid circulation slots 104 and the cooling liquid circulation grooves 103. Of course, in other embodiments, the ground terminals may also be exposed to the outside of the electrical connector 100 through a corresponding cooling liquid circulation grooves 103 and a corresponding cooling liquid circulation slots 104 so as to achieve a better heat dissipation effect.

Specifically, the elastic contact arm 22 of the first signal terminal S1 of the first differential pair signal terminals DP1 is partially exposed to the first cooling liquid circulation groove 103*a*. The elastic contact arm 22 of the second signal terminal S2 is partially exposed to the second cooling liquid circulation groove 103*b*. Moreover, the elastic contact arm 22 of the first signal terminal S1 is partially exposed to the fifth cooling liquid circulation groove 103*e*. The elastic contact arm 22 of the second signal terminal S2 is partially exposed to the sixth cooling liquid circulation groove 103*f*.

Similarly, the elastic contact arm 22 of the third signal terminal S3 of the second differential pair signal terminals DP2 is exposed to the seventh cooling liquid circulation groove 103*g*. The elastic contact arm 22 of the fourth signal terminal S4 is exposed to the eighth cooling liquid circulation groove 103*h*. Moreover, the elastic contact arm 22 of the third signal terminal S3 is exposed to the eleventh cooling liquid circulation groove 103*k*. The elastic contact arm 22 of the fourth signal terminal S4 is exposed to the twelfth cooling liquid circulation groove 103*l*.

In the illustrated embodiment of the present disclosure, the plurality of conductive terminals 2 include the first conductive terminals 2*a* and the second conductive terminals 2*b*.

When assembling, the first terminal module 20*a* and the second terminal module 20*b* are assembled into a corresponding first installation slot 102*a* and a corresponding second installation slot 102*b* along the first direction A1-A1. The first insulating block 4*a* and the second insulating block 4*b* are locked in the insulating body 1 to avoid falling off. The elastic contact arms 22 of the conductive terminals 2 extend into the mating slot 101. The contact portions 221 of the elastic contact arms 22 protrude into the mating slot 101 to contact with the mating connector.

Referring to FIG. 25 and FIG. 26, in the embodiment shown in the present disclosure, the end portion 222 of the elastic contact arm 22 of the first conductive terminal 2*a* is spaced apart from the first bottom surface 11*c* in the first direction A1-A1. The electrical connector 100 defines a first spacing groove 11*d* along the first direction A1-A1 between the first bottom surface 11*c* and the end portion 222 of the elastic contact arm 22 of the first conductive terminal 2*a*. The end portion 222 of the elastic contact arm 22 of the first conductive terminal 2*a* extends beyond the first inner wall surface 11*b* along the third direction A3-A3, so that an end surface 2221 of the end portion 222 of the first conductive terminal 2*a* is located outside the first inner wall surface 11*b*. In other words, the end surface 2221 of the end portion 222 of the first conductive terminal 2*a* is hidden in the first wall portion 11 along the first direction A1-A1 (that is, the end surface 2221 of the end portion 222 of the first conductive terminal 2*a* is not exposed to the mating slot 101 at all), in order to avoid damage to the first conductive terminals 2*a* caused by abutting against the end surfaces 2221 when the mating connector is inserted into the mating slot 101.

Similarly, referring to FIG. 25 and FIG. 26, in the embodiment illustrated in the present disclosure, the end portion 222 of the elastic contact arm 22 of the second conductive terminal 2*b* is spaced apart from the second bottom surface 12*c* in the first direction A1-A1. The electrical connector 100 defines a second spacing groove 12*d* between the second bottom surface 12*c* and the end portion 222 of the elastic contact arm 22 of the second conductive terminal 2*b* along the first direction A1-A1. The end portion 222 of the elastic contact arm 22 of the second conductive terminal 2*b* extends beyond the second inner wall surface 12*b* along the third direction A3-A3, so that the end surface 2221 of the end portion 222 of the second conductive terminal 2*b* is located outside the second inner wall surface 12*b*. In other words, the end face 2221 of the end portion 222 of the second conductive terminal 2*b* is hidden in the second wall portion 12 along the first direction A1-A1 (that is, the end face 2221 of the end portion 222 of the second conductive terminal 2*b* is not exposed to the mating slot 101 at all), in order to avoid damage to the second conductive terminals 2*b* caused by abutting against the end surfaces 2221 when the mating connector is inserted into the mating slot 101.

In the illustrated embodiment of the present disclosure, the end portion 222 is further bent from the contact portion 221. In a liquid-cooled environment or in the case of higher frequency requirements, in order to meet the requirements of signal integrity, for example, the characteristic impedance of the mating point is increased to match the characteristic impedance of other positions, while reducing the insertion loss and return loss. The end portion 222 of the conductive terminal 2 needs to be as short as possible. It is understandable to those skilled in the art that when the end portion 222 is shortened, it is easily damaged by the mating connector due to being exposed in the mating slot 101. The end portion 222 of the conductive terminal 2 of the present disclosure is further bent on the basis of the contact portion 221. On the one hand, this design keeps the length of the end portion 222 within a small dimension range; on the other hand, it ensures that the end portion 222 will not be damaged by the mating connector.

Figure 27:
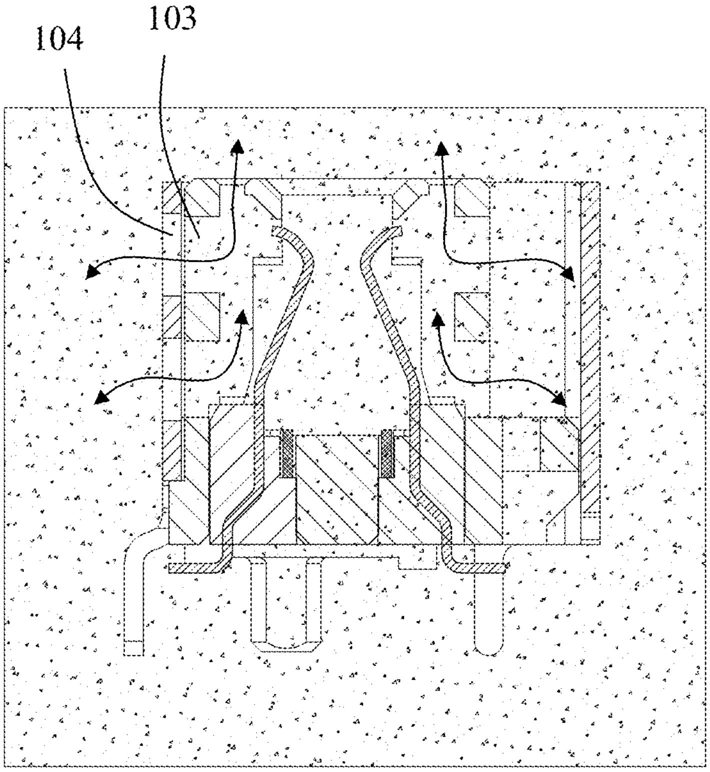
FIG. 27 is a schematic view of the electrical connector in FIG. 25 which is applied in a liquid-cooled environment.

Compared with the prior art, referring to FIG. 27, the electrical connector 100 in the present disclosure is applied in an environment with a dielectric constant (DK) greater than 1, such as a liquid-cooled environment. Liquid (such as cooling liquid) flows through the cooling liquid circulation grooves 103, the cooling liquid circulation slots 104, the first cooling liquid circulation openings 1521, the second cooling liquid circulation openings 1531, the first cooling liquid circulation holes 4*a*2 and the second cooling liquid circulation holes 4*b*2 and so on, so as to take away the heat generated when the electrical connector 100 and the mating connector work, thereby improving the heat dissipation performance of the electrical connector 100. Besides, the heat dissipation design of the present disclosure can promote the flow of liquid, so as to minimize possible air bubbles in the liquid. Even if bubbles are generated, they can be discharged in time with the flow of the liquid, thereby reducing the risk in use.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a plurality of wall portions, a mating surface and a mating slot extending through the mating surface; the plurality of wall portions comprising a first wall portion; the first wall portion comprising a first guiding inclined surface adjacent to the mating surface, a first inner wall surface connected to the first guiding inclined surface and extending along a first direction, a first bottom surface connected to the first inner wall surface, and a cooling liquid circulation groove communicating with the mating slot; the mating slot being configured to at least partially receive a mating connector along the first direction;

a plurality of conductive terminals, each conductive terminal comprising an elastic contact arm; the elastic contact arm comprising a contact portion which protrudes into the mating slot and is configured to be electrically connected with the mating connector, and an end portion which is connected to the contact portion and further bent from the contact portion; the end portion is spaced apart from the first bottom surface in the first direction; the electrical connector defining a first spacing groove between the first bottom surface and the end portion along the first direction; the end portion comprising an end surface; the end portion protruding beyond the first inner wall surface along a third direction such that the end surface is located outside the first inner wall surface; the third direction being perpendicular to the first direction; and a metal shell comprising a plurality of outer walls covering the insulating body; the plurality of outer walls comprising a first outer wall; the first outer wall defining a cooling liquid circulation slot communicating with the cooling liquid circulation groove.

2. The electrical connector according to claim 1, wherein the plurality of conductive terminals comprise a first differential pair signal terminals, a first ground terminal located on one side of the first differential pair signal terminals along a second direction, and a second ground terminal located on another side of the first differential pair signal terminals along the second direction; the first differential pair signal terminals comprise a first signal terminal and a second signal terminal which are disposed adjacently along the second direction; the second direction is perpendicular to the first direction and the third direction;

the first differential pair signal terminals are exposed to the outside of the electrical connector through the cooling liquid circulation groove and the cooling liquid circulation slot.

3. The electrical connector according to claim 2, wherein the plurality of wall portions comprise a second wall portion opposite to the first wall portion, a third wall portion connecting one end of the first wall portion and one end of the second wall portion, and a fourth wall portion connecting another end of the first wall portion and another end of the second wall portion; the fourth wall portion is disposed opposite to the third wall portion; the mating slot is at least enclosed by the first wall, the second wall, the third wall and the fourth wall;

the cooling liquid circulation groove comprises a first cooling liquid circulation groove and a second cooling liquid circulation groove; the first cooling liquid circulation groove and the second cooling liquid circulation groove are disposed at intervals along the second direction; the elastic contact arm of the first signal terminal is partially exposed to the first cooling liquid circulation groove; the elastic contact arm of the second signal terminal is partially exposed to the second cooling liquid circulation groove.

4. The electrical connector according to claim 3, wherein the cooling liquid circulation groove comprises a third cooling liquid circulation groove and a fourth cooling liquid circulation groove which are formed on the first wall portion and extend through the mating surface along the first direction; the third cooling liquid circulation groove and the fourth cooling liquid circulation groove are disposed at intervals along the second direction; the third cooling liquid circulation groove communicates with the first cooling liquid circulation groove; the fourth cooling liquid circulation groove communicates with the second cooling liquid circulation groove.

5. The electrical connector according to claim 3, wherein the cooling liquid circulation groove comprises a fifth cooling liquid circulation groove and a sixth cooling liquid circulation groove which are formed on the first wall portion and extend through the first wall portion; the fifth cooling liquid circulation groove and the sixth cooling liquid circulation groove are disposed at intervals and aligned with each other along the first direction; the sixth cooling liquid circulation groove and the second cooling liquid circulation groove are disposed at intervals and aligned with each other along the first direction; the elastic contact arm of the first signal terminal is partially exposed to the fifth cooling liquid circulation groove; the elastic contact arm of the second signal terminal is partially exposed to the sixth cooling liquid circulation groove.

6. The electrical connector according to claim 3, wherein the first outer wall covers the first wall portion; the plurality of outer walls further comprise a second outer wall covering the second wall portion, a third outer wall covering the third wall portion, and a fourth outer wall covering the fourth wall portion; the cooling liquid circulation slot comprises a first cooling liquid circulation slot provided on the first outer wall and extending through the first outer wall along the third direction; both the first cooling liquid circulation groove and the second cooling liquid circulation groove are exposed in the first cooling liquid circulation slot.

7. The electrical connector according to claim 6, wherein the second wall portion comprises a main body portion, a first support portion protruding away from the first wall portion from the main body portion along the third direction, and a second support portion protruding away from the first wall portion from the main body portion along the third direction; the first support portion and the second support portion are disposed at intervals along the second direction; the first support portion defines a first fixing groove; the second support portion defines a second fixing groove;

the second outer wall comprises a body portion supported on the first support portion and the second support portion, a first fixing piece bent inwardly from the body portion, and a second fixing piece bent inwardly from the body portion; the first fixing piece is fixed in the first fixing groove; and the second fixing piece is fixed in the second fixing groove.

8. The electrical connector according to claim 7, further comprising an accommodation space surrounded by the first support portion, the second support portion, the main body portion and the body portion; the accommodation space being located outside the mating slot;

wherein the second outer wall comprises an extending protrusion integrally extending from the body portion; the extending protrusion protrudes beyond the mating surface; the extending protrusion defines at least one locking hole extending through the extending protrusion along the third direction;

the accommodation space is configured to at least partially receive the mating connector; the at least one locking hole is configured to mate with a locking protrusion of the mating connector.

9. The electrical connector according to claim 8, wherein the cooling liquid circulation groove comprises a seventh cooling liquid circulation groove and an eighth cooling liquid circulation groove which are formed on the second wall portion and extend through the second wall portion; the seventh cooling liquid circulation groove and the eighth cooling liquid circulation groove are disposed at intervals along the second direction; both the seventh cooling liquid circulation groove and the eighth cooling liquid circulation groove communicate with the mating slot and the accommodation space;

the body portion defines a cooling liquid circulation through hole extending through the body portion along the third direction; the cooling liquid circulation through hole communicates with the accommodation space.

10. The electrical connector according to claim 9, wherein the cooling liquid circulation groove comprises a ninth cooling liquid circulation groove and a tenth cooling liquid circulation groove which are formed on the second wall portion and extend through the mating surface along the first direction; the ninth cooling liquid circulation groove and the tenth cooling liquid circulation groove are disposed at intervals along the second direction; the ninth cooling liquid circulation groove communicates with the seventh cooling liquid circulation groove; and the tenth cooling liquid circulation groove communicates with the eighth cooling liquid circulation groove.

11. The electrical connector according to claim 1, wherein the insulating body comprises a mounting surface and an installation slot extending through the mounting surface; the installation slot communicates with the mating slot;

the electrical connector comprises a terminal module installed in the installation slot; the terminal module comprises an insulating block to which the plurality of conductive terminals are fixed; the insulating block defines a cooling liquid circulation through hole which extends through the insulating block along the first direction and communicates with the mating slot.

12. The electrical connector according to claim 2, wherein the elastic contact arm of the first signal terminal comprises a first support section, a first inclined arm connected to the first support section, and a first contact portion connected to the first inclined arm; the contact portion comprises the first contact portion;

the first support section has a first width W1 along the second direction; the first contact portion has a second width W2 along the second direction; the first support section has a first thickness T1 along the third direction, wherein $W1-W2 \leq 0.1$ mm; $W1/W2 \leq 29/19$; and $W1/T1 \leq 9/5$.

13. An application of an electrical connector in a liquid-cooled environment, the electrical connector comprising:

an insulating body comprising a plurality of wall portions, a mating surface and a mating slot extending through the mating surface; the plurality of wall portions comprising a first wall portion; the first wall portion comprising a first guiding inclined surface adjacent to the mating surface, a first inner wall surface connected to the first guiding inclined surface and extending along a first direction, a first bottom surface connected to the first inner wall surface, and a cooling liquid circulation groove communicating with the mating slot; the mating slot being configured to at least partially receive a mating connector along the first direction;

a plurality of conductive terminals, each conductive terminal comprising an elastic contact arm; the elastic contact arm comprising a contact portion which protrudes into the mating slot and is configured to be electrically connected with the mating connector, and an end portion which is connected to the contact portion and further bent from the contact portion; the end portion is spaced apart from the first bottom surface in the first direction; the electrical connector defining a first spacing groove between the first bottom surface and the end portion along the first direction; the end portion comprising an end surface; the end portion protruding beyond the first inner wall surface along a third direction such that the end surface is located outside the first inner wall surface; the third direction being perpendicular to the first direction; and a metal shell comprising a plurality of outer walls covering the insulating body; the plurality of outer walls comprising a first outer wall; the first outer wall defining a cooling liquid circulation slot communicating with the cooling liquid circulation groove;

wherein the electrical connector is immersed in the liquid of the liquid-cooled environment; the liquid is capable of flowing through the cooling liquid circulation slot and the cooling liquid circulation groove to take away the heat generated by the electrical connector.

14. The application of the electrical connector in the liquid-cooled environment according to claim 13, wherein the plurality of conductive terminals comprise a first differential pair signal terminals, a first ground terminal located on one side of the first differential pair signal terminals along a second direction, and a second ground terminal located on another side of the first differential pair signal terminals along the second direction; the first differential pair signal terminals comprise a first signal terminal and a second signal terminal which are disposed adjacently along the second direction; the second direction is perpendicular to the first direction and the third direction;

the first differential pair signal terminals are exposed to the outside of the electrical connector through the cooling liquid circulation groove and the cooling liquid circulation slot.

15. The application of the electrical connector in the liquid-cooled environment according to claim 14, wherein the plurality of wall portions comprise a second wall portion opposite to the first wall portion, a third wall portion connecting one end of the first wall portion and one end of the second wall portion, and a fourth wall portion connecting another end of the first wall portion and another end of the second wall portion; the fourth wall portion is disposed opposite to the third wall portion; the mating slot is at least enclosed by the first wall, the second wall, the third wall and the fourth wall;

the cooling liquid circulation groove comprises a first cooling liquid circulation groove and a second cooling liquid circulation groove; the first cooling liquid circulation groove and the second cooling liquid circulation groove are disposed at intervals along the second direction; the elastic contact arm of the first signal terminal is partially exposed to the first cooling liquid circulation groove; the elastic contact arm of the second signal terminal is partially exposed to the second cooling liquid circulation groove.

16. The application of the electrical connector in the liquid-cooled environment according to claim 15, wherein the cooling liquid circulation groove comprises a third cooling liquid circulation groove and a fourth cooling liquid circulation groove which are formed on the first wall portion and extend through the mating surface along the first direction; the third cooling liquid circulation groove and the fourth cooling liquid circulation groove are disposed at intervals along the second direction; the third cooling liquid circulation groove communicates with the first cooling liquid circulation groove; the fourth cooling liquid circulation groove communicates with the second cooling liquid circulation groove.

17. The application of the electrical connector in the liquid-cooled environment according to claim 15, wherein the cooling liquid circulation groove comprises a fifth cooling liquid circulation groove and a sixth cooling liquid circulation groove which are formed on the first wall portion and extend through the first wall portion; the fifth cooling liquid circulation groove and the sixth cooling liquid circulation groove are disposed at intervals and aligned with each other along the first direction; the sixth cooling liquid circulation groove and the second cooling liquid circulation groove are disposed at intervals and aligned with each other along the first direction; the elastic contact arm of the first signal terminal is partially exposed to the fifth cooling liquid circulation groove; the elastic contact arm of the second signal terminal is partially exposed to the sixth cooling liquid circulation groove.

18. The application of the electrical connector in the liquid-cooled environment according to claim 15, wherein the first outer wall covers the first wall portion; the plurality of outer walls further comprise a second outer wall covering the second wall portion, a third outer wall covering the third wall portion, and a fourth outer wall covering the fourth wall portion; the cooling liquid circulation slot comprises a first cooling liquid circulation slot provided on the first outer wall and extending through the first outer wall along the third direction; both the first cooling liquid circulation groove and the second cooling liquid circulation groove are exposed in the first cooling liquid circulation slot.

19. The application of the electrical connector in the liquid-cooled environment according to claim 13, wherein the insulating body comprises a mounting surface and an installation slot extending through the mounting surface; the installation slot communicates with the mating slot;

the electrical connector comprises a terminal module installed in the installation slot; the terminal module comprises an insulating block to which the plurality of conductive terminals are fixed; the insulating block defines a cooling liquid circulation through hole which extends through the insulating block along the first direction and communicates with the mating slot.

20. The application of the electrical connector in the liquid-cooled environment according to claim 14, wherein the elastic contact arm of the first signal terminal comprises a first support section, a first inclined arm connected to the first support section, and a first contact portion connected to the first inclined arm; the contact portion comprises the first contact portion;

the first support section has a first width W1 along the second direction; the first contact portion has a second width W2 along the second direction; the first support section has a first thickness T1 along the third direction, wherein W1−W2≤0.1 mm; W1/W2≤29/19; and W1/T1≤9/5.

* * * * *